US012104625B2

(12) United States Patent
Staack et al.

(10) Patent No.: US 12,104,625 B2
(45) Date of Patent: Oct. 1, 2024

(54) EFFICIENT MECHANICAL GENERATION OF CAVITATION IN LIQUIDS

(71) Applicant: The Texas A & M University System, College Station, TX (US)

(72) Inventors: David Staack, College Station, TX (US); Xin Tang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 470 days.

(21) Appl. No.: 17/517,996

(22) Filed: Nov. 3, 2021

(65) Prior Publication Data

US 2022/0056934 A1 Feb. 24, 2022

Related U.S. Application Data

(63) Continuation of application No. 16/515,885, filed on Jul. 18, 2019, now Pat. No. 11,193,513.

(60) Provisional application No. 62/699,841, filed on Jul. 18, 2018.

(51) Int. Cl.
*F15D 1/00* (2006.01)

(52) U.S. Cl.
CPC .................................. *F15D 1/007* (2013.01)

(58) Field of Classification Search
CPC ...................................................... F15D 1/007
See application file for complete search history.

(56) References Cited

U.S. PATENT DOCUMENTS 4,175,535 A 11/1979 Diem
2013/0161232 A1 6/2013 Staack et al.

OTHER PUBLICATIONS

Hess et al., "Vortex Formation with a Snapping Shrimp Claw", 2013, Plos One, vol. 8, Issue 11, pp. 1-10 (Year: 2013).*
Tang, Xin and Staack, David, Bioinspired Mechanical Device Generates Plasma in Water via Cavitation, Science Advances, Mar. 15, 2019 [8 pages].
Samukawa, et al., The 2012 Plasma Roadmap, J. Phys. D. Appl. Phys. 45, 253001 (2012).
Leighton, T.G., et al., Cavitation Luminescence From Flow Over a Hydrofoil in a Cavitation Tunnel, J. Fluid Mech. 480, 43-60 (2003).
(Continued)

*Primary Examiner* — Eric Keasel
(74) *Attorney, Agent, or Firm* — Winstead PC

(57) ABSTRACT

In an embodiment, the present disclosure pertains to a cavitation generation device that includes a dactyl plunger rotatable about an axis between an open position and a closed position and a propus socket having a channel. The propus socket is rigidly mounted below the dactyl plunger, and the dactyl plunger is received into the propus socket when the dactyl plunger is in the closed position. The cavitation generation device can also include a torsion spring that biases the dactyl plunger into contact with the propus socket. In another embodiment, the present disclosure pertains to a method of inducing a cavitation including biasing a dactyl plunger via a torsion spring, and rotating the dactyl plunger, by action of the torsion spring, into a propus socket. The propus socket includes a nozzle-shaped channel. The method further includes ejecting a socket cavity volume through the nozzle-shaped channel thereby inducing a cavitation event.

20 Claims, 20 Drawing Sheets

(56) References Cited

OTHER PUBLICATIONS

Farhat, M., Proceedings of the Royal Society of London A: Mathematical, Physical and Engineering Sciences (The Royal Society, 2010).
Gaitan, D.F., An Experimental Investigation of Acoustic Cavitation in Gaseous Liquids, Thesis: The University of Mississippi (1990).
Suslick, K.S., Sonochemistry, Science 247, 1439-1445 (1990).
Putterman, S.J., Sonoluminescence: How Bubbles Turn Sound into Light, Annu. Rev. Fluid Mech. 32 445-476 (2000).
Brenner, M.P., Single-Bubble Sonoluminescence, Rev. Mod. Phys. 74, 425-484 (2002).
Suslick, K.S., Inside a Collapsing Bubble: Sonoluminescence and the Conditions During Cavitation, Annu. Rev. Phys. Chem. 59, 659-683 (2008).
Flannigan, D.J., Inertially Confined Plasma in an Imploding Bubble, Nat. Phys. 6, 598-601 (2010).
Wang, L., One-Step Reforming of CO2 and CH4 into High-Value Liquid Chemicals and Fuels at Room Temperature by Plasma-Driven Catalysis, Agnew. Chem. Int. Ed. 56, 13679-13683 (2017).
Locke, B.R., Electrohydraulic Discharge and Nonthermal Plasma for Water Treatment, Ind. Eng. Chem. Res. 45, 882-905 (2006).
Broekaert, J.A.C., Analytical Chemistry: Plasma Bubbles Detect Elements, Nature 455, 1185-1186 (2008).
Mariotti, D., Microplasmas for Nanomaterials Synthesis, J. Phys. D. Appl. Phys. 43, 323001 (2010).
Fridman, G., et al., Applied Plasma Medicine, Plasma Process. Polym. 5, 503-533 (2008).
Darwin, C., On the Origin of the Species by Means of Natural Selection, 1859 (Penguin Books 1968).
Parker, G.A., et al., Optimality Theory in Evolutionary Biology, Nature 348, 27-33 (1990).
Kaji, T., et al., Parallel Saltational Evolution of Ultrafast Movements in Snapping Shrimp Claws, Curr. Biol. 28, 106-113 e.4 (2018).
Versluis, M., et al., How Snapping Shrimp Snap: Through Cavitating Bubbles, Science 289, 2114-2117 (2000).
Buogo, S., et al., Implosion of an Underwater Spark-Generated Bubble and Acoustic Energy Evaluation Using the Rayleigh Model, J. Acoust. Soc. Am. 111, 2594-2600 (2002).
Xiao, P., et al., Microbubble Generation by Microplasma in Water, J. Phys. D. Appl. Phys. 47, 355203 (2014).
Hess, D., et al., Vortex Formation with a Snapping Shrimp Claw, PLOS ONE 8, e77120 (2013).
Koukouvinis, P., et al., Unveiling the Physical Mechanism Behind Pistol Shrimp Cavitation, Sci. Rep. 7, 13994 (2017).
Patek, S.N., et al., Biomechanics: Deadly Strike Mechanism of a Matis Shrimp, Nature 428, 819-820 (2004).
Patek, S.N., et al., Extreme Impact and Cavitation Forces of a Biological Hammer: Strike Forces of the Peacock Mantis Shrimp *Odontodactylus scyllarus*,, J. Exp. Biol. 208, 3655-3664 (2005).
Patek, S.N., et al., Linkage Mechanics and Power Amplification of the Manis Shrimp's Strike, J. Exp. Biol. 210, 3677-3688 (2007).
Anker, A., et al., Morphological Phylogeny of Alpheid Shrimps: Parallel Preadaptation and the Origin of a Key Morphological Innovation, the Snapping Claw, Evolution 60, 2507-2528 (2006).
Cignoni, P., et al., An Open-Sourced Mesh Processing Tool, in Eurographics Italian Chapter Conference, V. Scarano, R. De Chiara, U. Erra, Eds. (The Eurographics Association, 2008.
Corsini, M., et al., Efficient and Flexible Sampling with Blue Noise Properties of Triangular Meshes, IEEE Trans. Vis. Comput. Graph. 18, 914-924 (2012).
Hiller, R., et al., Effect of Noble Gas Doping in Single-Bubble Sonoluminescence, Science 266, 248-250 (1994).
Flannigan, D.J., Plasma Line Emissions During Single-Bubble Cavitation, Phys. Rev. Lett. 95, 44301 (2015).
Supponen, O., et al., Scaling Laws for Jets of Single Cavitation Bubbles, J. Fluid Mech. 802, 263-293 (2016).
Obreschkow, D., et al., Cavitation Bubble Dynamics Inside Liquid Drops in Microgravity, Phys. Rev. Lett. 97, 094502 (2006).
Tinguely, M., et al., Energy Partition at the Collapse of Spherical Cavitation Bubbles Phys. Rev. E. Stat. Nonlin. Soft Matter Phys. 86, 046315 (2012).
Lauterborn, W., et al., Cavitation Bubble Dynamics, Ultrason. Sonochem. 4, 65-75 (1997).
Akhatov, I., et al., Collapse and Rebound of a Laser-Induced Cavitation Bubble, Phys. Fluids 13, 2805-2819 (2001).
Brujan, E. A., et al., Dynamics of Laser Induced Cavitation Bubbles Near an Elastic Boundary, J. Fluid Mech. 433, 251-281 (2001).
Weninger, K.R., et al., Energy Focusing in a Converging Fluid Flow: Implications for Sonoluminescence, Phys. Rev. Lett. 83, 2081-2084 (1999).
Su, C.K., et al., Cavitation Luminescence in a Water Hammer: Upscaling Sonoluminescence, Phys. Fluids 15, 1457-1461 (2003).
Barber, B.P., et al., Observation of Synchronous Picosecond Sonoluminescence, Nature 352, 318-320 (1991).
McNamara, W.B., et al., Sonoluminescence Temperatures During Multi-Bubble Cavitation, Nature 401, 772-775 (1999).
Kornilova, A.A., et al., Generation of X-Rays at Bubble Cavitation in a Fast Liquid Jet in Dielectric Channels, J. Surf. Investig. Synchrotron Neutron Tech. 3, 275-283 (2009).
Staack, D., et al., Nanoscale Corona Discharge in Liquids, Enabling Nanosecond Optical Emission Spectroscopy, Agnew. Chem. Int. Ed. 47, 8020-8024 (2008).
Herberholz, J., et al., Flow Visualization and High Speed Video Analysis of Water Jets in teh Snapping Shrimp (*Alpheus heterochaelis*), J. Comp. Physiol. A. 185, 41-49 (1999)>.
Herberholz, J., et al., Role of Mechanosensory Stimuli in Intraspecific Agonistic Encouters of the Snapping Shrimp (*Alpheus heterochaelis*), Biol. Bull. 195, 156-167 (1998).
Lohse, B., et al., Snapping Shrimp Make Flashing Bubbles, Nature 413, 477-478 (2001).
Werner, E., et al., Optimal Foraging and the Size Selection of Prey by the Bluegill Sunfish (*Lepomis macrochirus*), Ecology 55, 1042-1052 (1974).
Everest, F.A., et al., Acoustical Characteristics of Noise Produced by Snapping Shrimp, J. Acoust. Soc. Am. 20, 137-142 (1948).
Herberholz, J., et al., Signaling via Water Currents in Behavioral Interactions of Snapping Shrimp (*Apheus heterochaelis*), Biol. Bull. 201, 6-16 (2001).
Cook, J.A., et al., A Spark-Generated Bubble Model with Semi-Emperical Mass Transport, J. Acoust. Soc. Am. 101, 1908-1920 (1997).
Baghdassarian, O., et al., Luminescence Characteristics of Laser-Induced Bubbles in Water, J. Phys. D. Appl. Phys. 47, 355203 (2014).
Lazic, V., et al., Insights in the Laser-Induced Breakdown Spectroscopy Signal Generation Underwater Using Dual Pulse Excitation—Part I: Vapor Bubble, Shockwaves and Plasma, Spectrochim. Acta Part B At. Spectrosc. 82, 42-49 (2013).
Lazic, V., et al., Insights in the Laser Induced Breakdown Spectroscopy Signal Generation Underwater Using Dual Pulse Excitation—Part II: Plasma Emission Intensity as a Function of Interpulse Delay, Spectrochim. Acta Part B At. Spectrosc. 82, 50-59 (2013).
Cox, S.M., et al., A Physical Model of the Extreme Mantis Shrimp Strike: Kinematics and Cavitation of Ninjabot, Bioinspir. Biomim. 9, 16014 (2014).
Ohl, C.D., Probing Luminescence from Nonspherical Bubble Collapse, Phys. Fluids 14, 2700-2708 (2002).
Lauterborn, W., et al., Experimental Investigations of Cavitation-Bubble Collapse in the Neighbourhood of a Solid Boundary, J. Fluid Mech. 72, 391-399 (1975).

* cited by examiner

EFFICIENT MECHANICAL GENERATION OF CAVITATION IN LIQUIDS

CROSS-REFERENCE TO RELATED APPLICATIONS

This patent application is a continuation of U.S. patent application Ser. No. 16/515,885, filed on Jul. 18, 2019. U.S. patent application Ser. No. 16/515,885 claims priority from, and incorporates by reference the entire disclosure of, U.S. Provisional Patent Application No. 62/699,841 filed on Jul. 18, 2018.

STATEMENT REGARDING FEDERALLY SPONSORED RESEARCH

This invention was made with government support under PHY-1057175 awarded by the National Science Foundation. The government has certain rights in the invention.

TECHNICAL FIELD

The present disclosure relates generally to the generation of cavitation in liquids and more particularly, but not by way of limitation, to devices and methods for efficient mechanical generation of cavitation in liquids.

BACKGROUND

This section provides background information to facilitate a better understanding of the various aspects of the disclosure. It should be understood that the statements in this section of this document are to be read in this light, and not as admissions of prior art.

Nature can generate plasma in liquids more efficiently than human designed devices using electricity, acoustics, or light. For example, snapping shrimp can induce cavitation which collapse to produce high pressures and temperatures, leading to efficient plasma formation with photon and shock wave emission via energy focusing. The present disclosure seeks to mimic such functionality with bio-inspired mechanical devices.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a cavitation generation device that includes a dactyl plunger rotatable about an axis between an open position and a closed position and a propus socket having a channel. The propus socket is rigidly mounted below the dactyl plunger, and the dactyl plunger is received into the propus socket when the dactyl plunger is in the closed position. The cavitation generation device can also include a torsion spring that biases the dactyl plunger into contact with the propus socket.

In some embodiments, the cavitation generation device includes a base having a first end opposite a second end, where the first end extends upwardly perpendicular from the base and the second end extends upwardly perpendicular from the base. In some embodiments, the first end extends higher than the second end. The cavitation generation device further includes a bearing mount coupled to the second end. The bearing mount has a flanged ball bearing assembly. The dactyl plunger is rotatable about the axis formed by the flanged ball bearing assembly. In some embodiments, the cavitation generation device includes a clutch attached to an upper portion of the first end. The clutch cocks the dactyl plunger to a cocking angle before allowing the dactyl plunger to rapidly snap towards a propus socket. In various embodiments, the cocking angle may be adjusted by inserting a stop rod at different positions in the clutch.

In some embodiments, the cavitation generation device includes a dactyl gear operatively coupled to the dactyl plunger and a pinion gear disposed on a drive shaft. The pinion gear being rotatably engaged with the dactyl gear and the cavitation generation device further having a motor operatively coupled to a gearbox. The gearbox is operatively coupled to the drive shaft so as to impart rotational motion to the drive shaft and the pinion gear, and where rotation of the pinion gear induces periodic actuation of the dactyl gear and the dactyl plunger. In some embodiments, the cavitation generation device includes a first pulley and a second pulley where the first pulley is rotatably coupled to the gearbox and the drive shaft is received in a central axis of the second pulley. The second pulley is rotatable about a same axis as the pinion gear.

In some embodiments, the channel is a nozzle-shaped channel. In some embodiments, the cavitation generation device has an angle between a channel direction and a rotational plane of the dactyl plunger. In some embodiments, the angle is approximate 25. In some embodiments, the cavitation generation device includes a propus socket cavity volume ejectable through the channel.

In another embodiment, the present disclosure pertains to a cavitation generation device including a base having a first end opposite a second end. The first end extends upward perpendicular from the base and the second end extends upward perpendicular from the base. In some embodiments, the first end extends higher than the second end. The cavitation device further includes a bearing mount coupled to the second end. The bearing mount has a flanged ball bearing assembly. The cavitation device also includes a dactyl plunger rotatable about the flanged ball bearing assembly between an open position and a closed position and a propus socket having a channel. The propus socket is rigidly mounted below the dactyl plunger, and the dactyl plunger is received into the propus socket when the dactyl plunger is in the closed position. The cavitation generation device further includes a torsion spring that biases the dactyl plunger into contact with the propus socket, a dactyl gear operatively coupled to the dactyl plunger, and a pinion gear disposed on a drive shaft. The pinion gear is rotatably engaged with the dactyl gear. The cavitation generation device also has a motor operatively coupled to a gearbox. The gearbox is operatively coupled to the drive shaft so as to impart rotational motion to the drive shaft and the pinion gear, where rotation of the pinion gear induces periodic actuation of the dactyl gear and the dactyl plunger. In various embodiments, a height difference between the first end and the second end facilitates proper cocking of the dactyl plunger.

In further embodiment, the present disclosure pertains to a method of inducing a cavitation including biasing a dactyl plunger via a torsion spring, and rotating the dactyl plunger, by action of the torsion spring, into a propus socket. The propus socket includes a nozzle-shaped channel. The method further includes ejecting a socket cavity volume through the nozzle-shaped channel thereby inducing a cavitation event. In some embodiments, the method includes creating at least one implosion singularity at the surface of the dactyl plunger and a distance from the dactyl plunger. In some embodiments, the method includes creating a single cavitation event by selecting a specific torsion spring or dactyl plunger material. In some embodiments, the method includes creating an expanding shock front generated by the at least one implosion singularity. In some embodiments, the at least one implosion singularity is a result of collapsing cavitation. In some embodiments, the method includes converting torsion spring energy of the torsion spring to cavitation potential energy. In some embodiments, the cavitation event results in an emission of light. In some embodiments, the method includes creating at least one of a shock wave and plasma as a result of the ejecting.

In various embodiments, the present disclosure relates to a device for inducing a cavitation including a linear actuated plunger disposed within a socket. The socket includes a nozzle formed therein. During operation impulse impact on the plunger causes the plunger to eject water from the socket through the nozzle. The discharge velocity of the water induces a cavitation event in the surrounding water.

BRIEF DESCRIPTION OF THE DRAWINGS

A more complete understanding of the subject matter of the present disclosure may be obtained by reference to the following Detailed Description when taken in conjunction with the accompanying Drawings.

FIG. 6A shows Trial #4 ICCD image. FIG. 6B shows Trial #4 oscilloscope data and PMT signal zoom-in, the duration time of light emission FWHM is less than 13.0 ns, the ICCD shutter signal and PMT signal are scaled to ⅕ and 5 times, respectively, for better data visualization. FIG. 6C shows Trial #15 ICCD image. FIG. 6D shows Trial #15 oscilloscope data and PMT signal zoom-in, the duration time of light emission FWHM is less than 13.2 ns. FIG. 6E shows Trial #20 ICCD image. FIG. 6F shows Trial #20 oscilloscope data and PMT signal zoom-in, the two durations of light emission FWHM is less than 16.2 ns.

FIG. 7A shows a probability distribution of the average intensity of pixels above threshold (9σ) for different trials, bin width=10. FIG. 7B shows cavitation locations, marked by diamonds, relative to a claw, regarding the pivot axis of dactyl plunger as origin. FIG. 7C shows Trial #1 ICCD image.

FIG. 7D shows Trial #1 oscilloscope data, the ICCD shutter signal are scaled to ⅕ for better data visualization. FIG. 7E shows Trial #21 ICCD image. FIG. 7F shows Trial #29 ICCD image.

FIG. 8A shows a probability distribution of the average intensity of pixels above threshold (9σ) for different trials, bin width=10. FIG. 8B shows cavitation locations, marked by diamonds, relative to a claw, regarding the pivot axis of dactyl plunger as origin. FIG. 8C shows Trial #8 ICCD image.

FIG. 8D shows oscilloscope data for trial #10. FIG. 8E shows Trial #4 ICCD image.

FIG. 8F shows Trial #11 ICCD image.

FIG. 10A shows an experimental setup for schlieren imaging. FIG. 10B shows three-exposed images with exposure time 100 ns, delay time between images 10 μs. FIG. 10C shows two-exposed images with exposure time 100 ns, delay time between images 15 μs. FIG. 10D shows two-exposed images with exposure time 100 ns, delay time between images 15 μs.

DETAILED DESCRIPTION

Figure 1A:
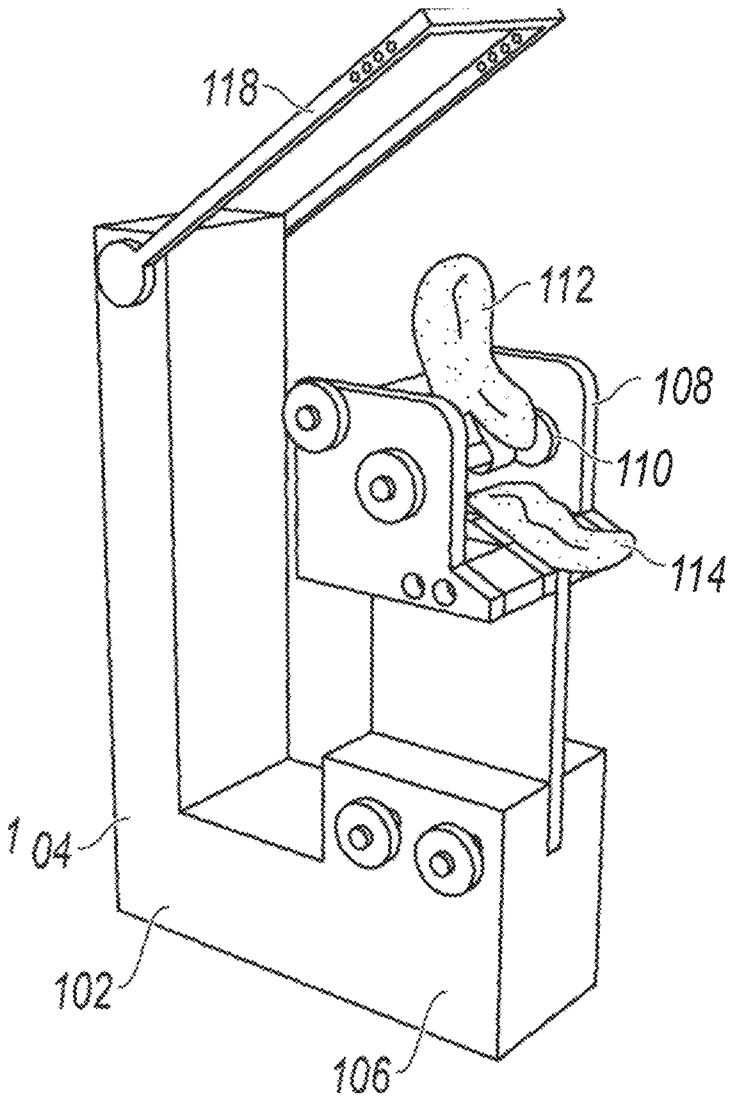
FIG. 1A is a perspective view of a cavitation generation device according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Nature can generate plasma in liquids more efficiently than human designed devices using electricity, acoustics, or light. In the animal world, snapping shrimp can induce cavitation which collapse to produce high pressures and temperatures, leading to efficient plasma formation with photon and shock wave emission via energy focusing. The present disclosure relates generally to bio-inspired mechanical devices which mimic the plasma generation technique of the snapping shrimp. The devices of the present disclosure, in some embodiments, are manufactured using additive manufacturing based on micro-X-ray computed tomography of a snapping shrimp claw molt. In some embodiments, a spring fixture is designed to reliably actuate the claw with appropriate force and velocity to produce a high-speed water jet that matches the cavitation number and Reynolds number of the shrimp. Light emission and shocks were imaged, as discussed in further detail herein, and indicate that the devices of the present disclosure reproduce the shrimp's plasma generation technique, and are more efficient than other plasma generation methods.

Plasmas in, and in contact with, liquids are conventionally generated by intense electric fields. Such plasmas in liquids are studied from two perspectives: chemical processing and analytics, and physics fundamentals of high energy density states and energy focusing, such as hydrodynamic cavitation luminescence, sonoluminescence, and X-ray. In engineering applications, such as fuel reforming and water treatment, high efficiency is preferred since it affects the final processing economics. For applications in elemental detection, materials processing, and medical treatments efficiency is important due to the desire for compact, low cost, and controllable plasma sources.

For some species of snapping shrimp, cavitation generation is used in hunting, defense, intraspecific communication, and tunneling activities, all of which can emit light, indicating plasma generation. The shrimp's plasma generation technique is very efficient due to evolutionary pressure. The cavitation dynamics and light emission process using a live snapping shrimp (Alpheus heterochaelis) have been investigated. Snapping shrimp generate cavitation by shooting out a high-speed water jet with a sudden snap of its large snapper claw, which makes a loud crackling noise. The compression process after cavitation initiation is so intense that gases inside the cavitation reach high temperatures capable of generating plasma and light emission. This light emission phenomenon is similar to sonoluminescence in that it occurs at the high-pressure high-temperature singularity following the collapse of a cavitation bubble. Electrically induced microbubbles and plasmas, and laser-induced cavitation bubbles are slightly different; they initiate as a high-pressure high-temperature luminescent singularity which then expands and oscillates as a cavitation bubble. Attempts to mimic the shrimp have been made, however none have accurately reproduced the cavitation mechanism. Previous designs included a scaled-up 70× mechanical device with the 2-dimensional (2D) mid-plane curves of the plunger and socket. This bio-inspired device was designed to match the Reynolds number of the shrimp and was able to reproduce some of the vortex formation mechanism, but did not reproduce the cavitation. The corresponding Computational Fluid Dynamics (CFD) simulations were conducted based on the same device.

The present disclosure describes and artificially reproduces the cavitation's generation and collapse, shock wave, and plasma generation generated by the shrimp. A scaled-up (5×) mechanical claw device using additive manufacturing with 3-dimensional (3D) surfaces based on micro-X-ray computed tomography (μ-CT) scanning of an Alpheus formosus shrimp claw was designed and manufactured. The bio-inspired device facilitates repetitive and consistent experiments on cavitation processes and plasma generation. The devices of the present disclosure fill the aforementioned gaps in prior designs and accumulate authoritative evidence of mechanically generated plasma in cavitation luminescence. The bio-inspired devices of the present disclosure facilitate in learning more about the snapping shrimp, energy focusing, and underwater plasmas that leads to understandings that enabling the design of more efficient devices and systems.

Reference will now be made to more specific embodiments of the present disclosure and data that provides support for such embodiments. However, it should be noted that the disclosure below is for illustrative purposes only and is not intended to limit the scope of the claimed subject matter in any way.

Figure 1B:
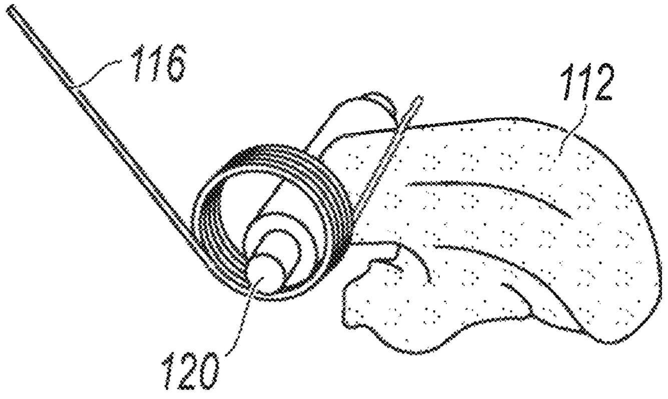
FIG. 1B illustrates shows a dactyl plunger with step a shaft and a torsion spring according to aspects of the disclosure.
Figure 1C:
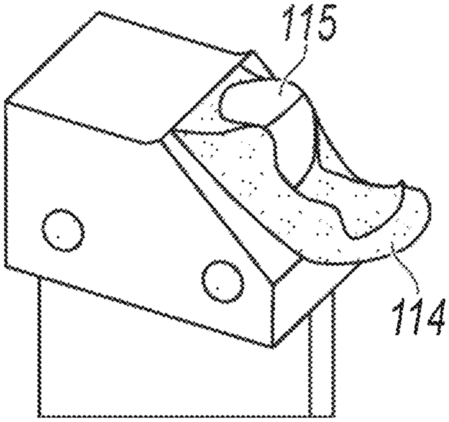
FIG. 1C illustrates an immobile propus and socket cavity volume according to aspects of the disclosure.
Figure 1D:
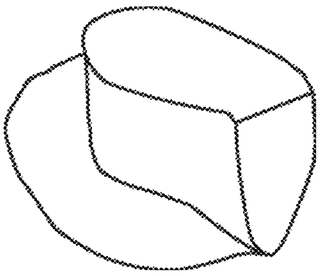
FIG. 1D illustrates a socket cavity volume geometry according to aspects of the disclosure.

FIG. 1A illustrates a manual cavitation generation device 100. FIG. 1B illustrates a dactyl plunger 112 with a step shaft 120 and torsion spring 116. FIG. 1C shows an immobile propus socket 114 and cavity volume, with a socket exit channel 115. FIG. 1D shows the propus socket 114 volume geometry. The cavitation device 100 includes a base 102 having a first end 104 and a second end 106. The first end 104 and the second end 106 extend upwardly from the base 102 and the first end 104 extends higher than the second end 106. A bearing mount 108 is coupled to the second end 106 and includes a flanged ball bearing assembly 110. A dactyl plunger 112 is coupled to the flanged ball bearing assembly 110 and is rotatable between an open position and a closed position. The propus socket 114 receives the dactyl plunger 112 when the dactyl plunger 112 is in the closed position. The propus socket 114 is rigidly mounted below the dactyl plunger 112. The torsion spring 116 biases the dactyl plunger 112 into contact with the propus socket 114. The dactyl plunger 112 is operatively coupled to a clutch 118 such that actuation of the clutch 118 causes the dactyl plunger 114 to move from the closed position to the open position and then rapidly snap back to the closed position. In various embodiments, the clutch 118 releases the dactyl plunger 114 from a select cocking angle.

Figure 1G:
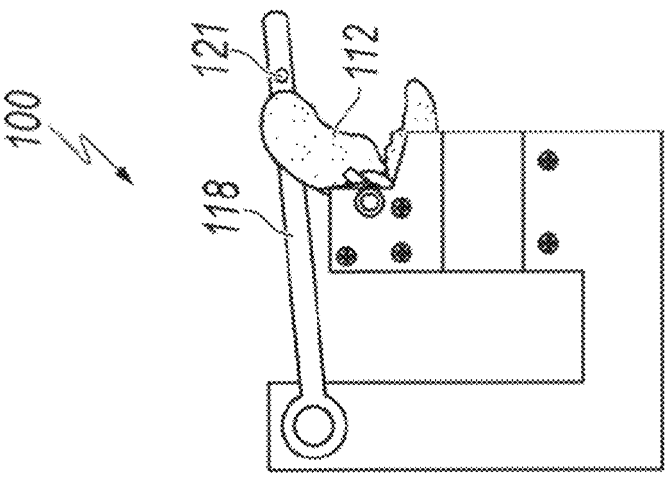
FIG. 1G is a side view of the cavitation generation device of FIG. 1A showing the stop rod in a second position and the dactyl plunger at a second cocking angle.
Figure 1F:
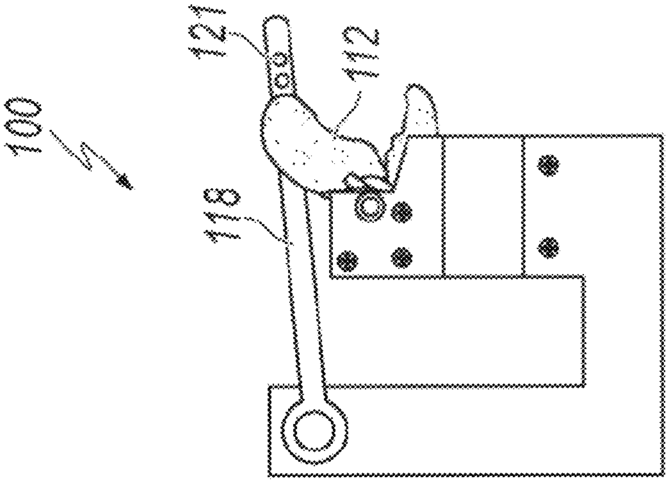
FIG. 1F is a side view of the cavitation generation device of FIG. 1A showing the stop rod in a first position and the dactyl plunger at a first cocking angle.
Figure 1E:
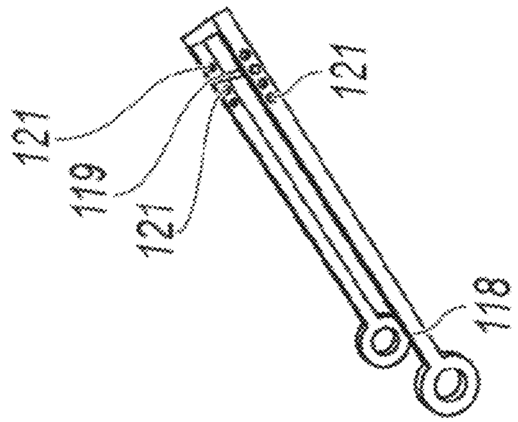
FIG. 1E is a perspective view of a clutch illustrating a stop rod according to aspects of the disclosure.

FIG. 1E is a perspective view of the clutch 118. The clutch includes a stop rod 119. The stop rod 119 is received through holes 121 formed in the clutch 118. By way of example. FIG. 1E illustrates a clutch 118 with four pairs of holes 121; however, in other embodiments, the clutch 118 could include any number of pairs of holes 121. FIG. 1F is a side view of the cavitation generation device 100 showing the stop rod 119 in a first position and the dactyl plunger 112 at a first cocking angle. FIG. 1G is a side view of the cavitation generation device 100 showing the stop rod 119 in a second position and the dactyl plunger 112 at a second cocking angle. Referring to FIGS. 1E-1G, the cocking angle may be varied by inserting the stop rod 119 through a select pair of holes 121. A driving torque of the dactyl plunger 112 is different at different cocking angles. Variation of the driving torque of the dactyl plunger 112 results in a different tip speed of the dactyl plunger 112 as well as different liquid ejection speeds. Choosing a suitable cocking angle can reduce the incidence of back cavitation of the dactyl plunger 112.

During operation, the dactyl plunger 112 tightly fits into the propus socket 114 and displaces water inside the socket through the channel 115 that is formed in the propus socket 114. Rapid acceleration of the dactyl plunger 112 induces a high-speed water jet to issue from the channel 115. The rapid ejection speed causes the liquid surrounding the channel 115 to boil in a process called "cavitation." As the cavitation bubbles collapse, a submerged shockwave is created that emits small burst of light through an effect known as "cavitation luminescence." In various embodiments, an angle of approximately 25 exists between the water channel direction and the rotation plane of the dactyl plunger 112. This angle enhances cavitation in a targeted direction and physically separates the cavitation from the surface of the dactyl plunger 112, which results in an isolated cavitation collapse without self-inflicted cavitation damage. The back of the dactyl plunger 112 includes a shaft 120 to facilitate attachment of the torsion spring 116 and flanged ball bearing assembly 110. In various embodiments, the cavity volume of the propus socket 114 is approximately 222.89 $mm^3$.

Figure 2A:
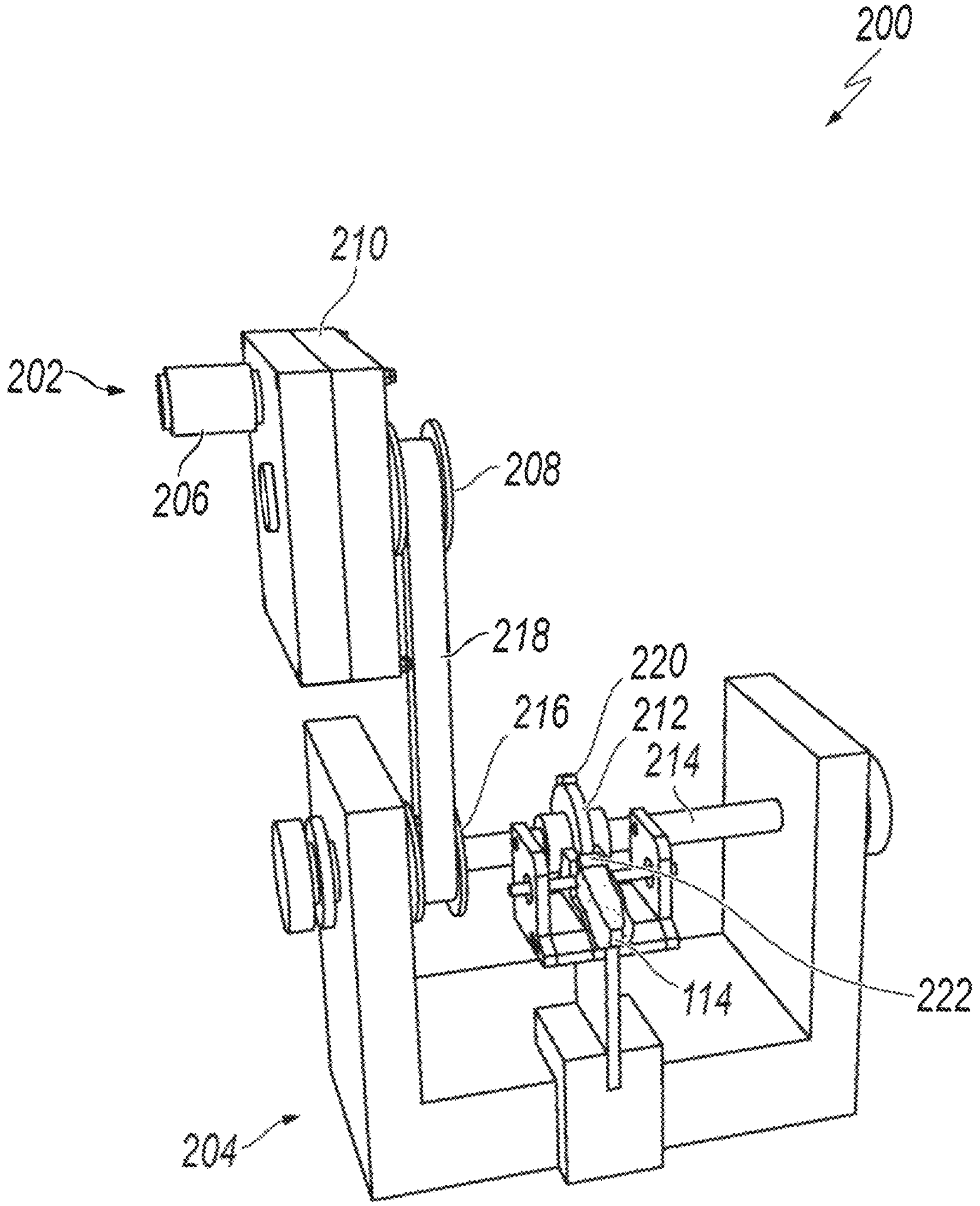
FIG. 2A illustrates a cavitation generation device according to an embodiment of the present disclosure.
Figure 2B:
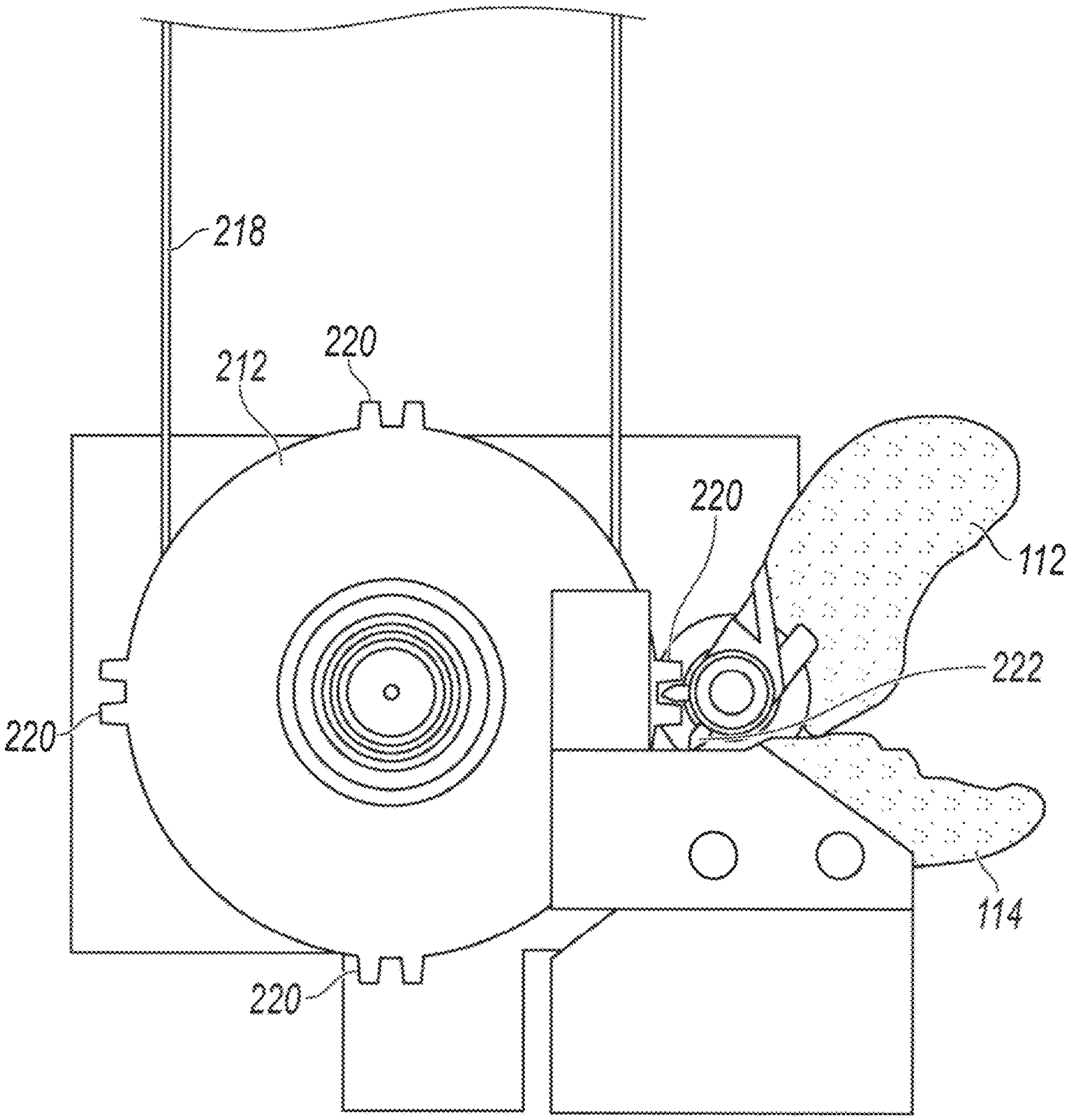
FIG. 2B illustrates a side view of a pinion gear and a dactyl gear cam of the cavitation generation device of FIG. 2A.

FIG. 2A illustrates a cavitation generation device 200. FIG. 2B illustrates a side view of a pinion gear 212 and a dactyl gear 222 of the cavitation generation device 200. Referring to FIGS. 2A and 2B collectively, the cavitation generation device 200 includes a motor assembly 202 and a snapping assembly 204. The motor assembly 202 includes a motor 206 that is coupled to a first pulley 208 via a gearbox 210. In various embodiments, the motor 206 is, for example, a McMaster 6409K15; however, in other embodiments, different varieties of motors could be utilized. The snapping assembly 204 includes a pinon gear 212 that is mounted on a drive shaft 214 with a second pulley 216. A belt 218 couples the first pulley 208 to the second pulley 216 and transfers torque from the motor 206 to the pinon gear 212. Such an arrangement allows the snapping assembly 204 to be submerged in a liquid such as, for example, water while the motor assembly 202 remains unsubmerged. In various embodiments, the pinion gear 212 includes four pairs of teeth 220; however, in other embodiments, any number of teeth 220 could be utilized in order to adjust snapping frequency of the dactyl plunger 112 into the propus socket 114. The teeth 220 of the pinon gear 212 engage a dactyl gear 222 for cocking and triggering the dactyl plunger 112 to snap. In various embodiments, the size of the first pulley 208 and the second pulley 216 can be modified in order to change the snapping frequency of the dactyl plunger 112. The second pulley 216, which shares the drive shaft 214 with the pinion gear 212 transfers the torque via the drive shaft 214 to the pinon gear 212. The teeth 220 engage the dactyl gear 222 and lift the dactyl plunger 112, overcoming the torsion spring 126. A two-teeth 222 design that works as a cam ensures the cocking angle before releasing when the dactyl gear 222 detached from pinion gear 212.

With the cavitation generation device 200, the snapping frequency of the dactyl plunger 112 may be adjusted to, for example, approximately 0.8 Hz, making great progress compared to a manual triggering mechanism (approximately 0.05 Hz or less). With a choice of the motor 206, the first pulley 208, the second pulley 216, and the number of pairs of gear teeth 220, there is a large potential to upgrade the snapping frequency of the dactyl plunger 112 to the order of, for example, approximately 10 Hz.

Working Examples

Design of the Bio-Inspired Device. Although previous research utilized only the 2D mid-plane curve of the snapper claw, these studies did successfully obtain 3D claw morphology information for a single species of shrimp, Alpheus bellulus. The species of shrimp utilized herein is the Alpheus formosus, which were purchased and kept in a saltwater aquarium for months while snapper claw molts were collected.

Figure 3A:
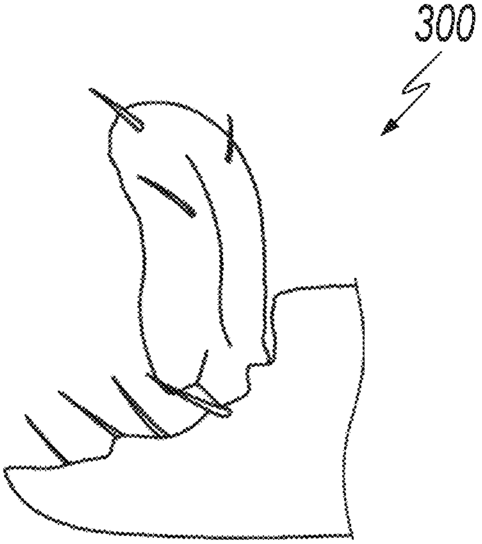
FIG. 3A illustrates a microscope image of the snapper claw molt.
Figure 3B:
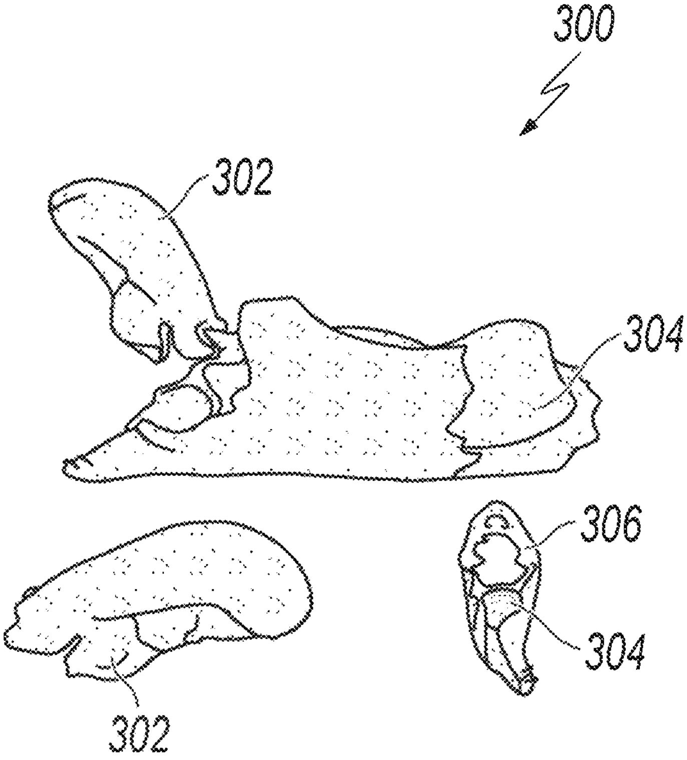
FIG. 3B illustrates a 3-dimensional (3D) rendering of a converted snapper claw mesh according to aspects of the disclosure.

FIG. 3A illustrates a snapper claw molt 300. The snapper claw molt 300 was collected for μ-CT scanning and via surface determination was converted into a mesh file which contains claw morphology information and quantitative 3D geometrical data of the snapper claw. FIG. 3B illustrates a model of the snapper claw 300. Via processes, such as, for example, bridging and filling cavity holes in the model and reducing unnecessary points and surfaces in MeshLab, the open snapper claw 300 was divided into two separate manifold parts: the dactyl plunger 302 and the propus socket 304.

After refining morphology data from the snapper claw 300, the dactyl plunger 302 and the propus socket 304 were aligned by assigning an axis of rotation that would ensure proper clearance. Minor material wear during operation further ensured a proper fit. Torsion springs were used to mimic the torque applied by the shrimp's muscle. The dactyl plunger had a largest dimension of 4.87 mm, but was fabricated at, for example, 5× actual size to facilitate manufacture and mechanical integration. An ordinary differential equation (ODE) numerical model characterized the dactyl dynamics with simplified physical aspects, as described in further detail below, and was implemented to improve the design, match non-dimensional Reynolds and cavitation numbers, and other parameter selection.

The snapper claw mechanism includes two components which contribute to operation: the dactyl plunger 302 and the propus socket 304. The dactyl plunger 302 tightly fits into the propus socket 304 which displaces water inside the socket through a nozzle-shaped channel 306. The rapid acceleration of the dactyl plunger 302 induces the high-speed water jet to issue from the channel 306 and initiate cavitation. An angle of approximately 25 exists between the water channel direction and the rotation plane of the dactyl plunger 302. This angle may exist evolutionarily to enhance cavitation in a targeted direction and physically separate the cavitation from the surface of the dactyl plunger 302, which results in an isolated cavitation collapse without self-inflicted cavitation damage. The back of the dactyl plunger 302 was modified for attachment of the torsion spring and flanged ball bearing assembly (illustrated in FIG. 1A), while the propus socket 304 was mounted rigidly below the dactyl plunger 302.

An additive manufacturing process, such as, for example, 3D printing, was utilized to fabricate the complex geometry of the bio-inspired claws of the present disclosure. For example, 3D printed parts, such as the dactyl plunger 112 and propus socket 114, together with the clutch 118, were utilized as disclosed herein. These parts were printed using 'white strong flexible plastic' (such as, for example, EOS PA2200) due to its strength and low moment of inertia. Although accidental snapping of the claw 300 in air can destroy it, this does not happen in water due to the increased drag.

Figure 4A:
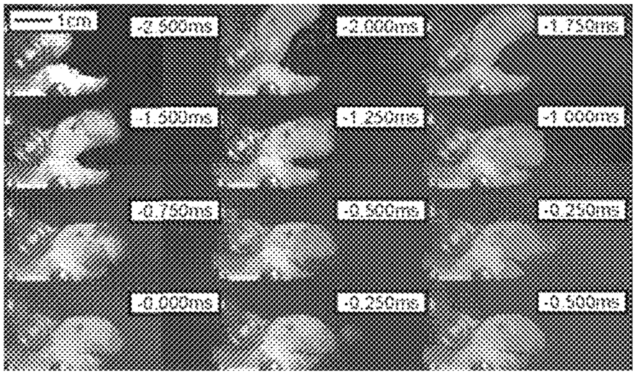
FIG. 4A shows selected high frame rate video frames during device operation, emphasizing cavitation evolution. The raw video was recorded at 60,000 fps with t=0.000 ms corresponding to the first singularity, when the first minimum was reached by the collapsing cavitation.

High Frame Rate Videography. High frame rate videography of the bio-inspired device in operation underwater was taken using a CCD camera (Photron, FASTCAM SA5), capable of one million frames per second (fps). This camera was used to estimate dactyl plunger tip speed and to image cavitation evolution, at a frame rate of 60,000 fps. A series of selected high frame rate video imaging stills of the rotating dactyl plunger driven by two weak torsion springs with front lighting are shown in FIG. 4A to illustrate claw operation. Two cavitation sites were spotted: one from the water jet and the second along the tip of the claw. This leads to one implosion singularity site at the surface of the dactyl plunger and another one located at a distance from the dactyl plunger, generated by the high-speed jet. The term "singularity site" refers to the finite-time minimum volume of a collapsing cavitation-site position. The cavitation generated by the high-speed jet is spheroid-like and oscillatory in time (FIG. 4A). Since the cavitation volume was difficult to estimate accurately, an effective radius, (FIG. 4B) was approximated by assuming a volumetric equivalent ellipsoidal cavitation with major and minor axes measured from the video.

Figure 4B:
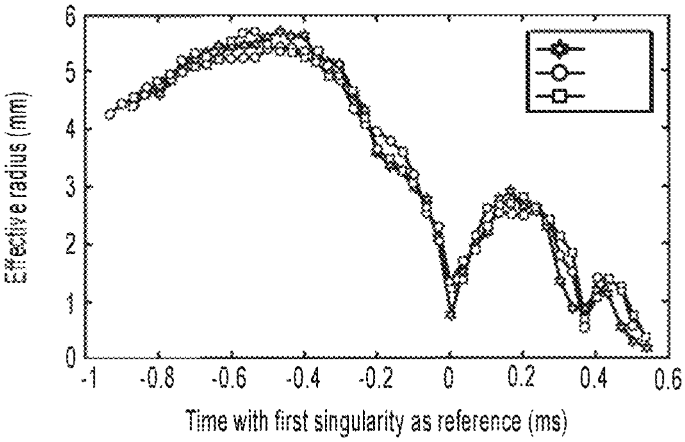
FIG. 4B shows a plot of effective radius over time for 3 different trials, with an average maximum radius of 5.61 mm and an average conversion efficiency of 36.1%.
Figure 4C:
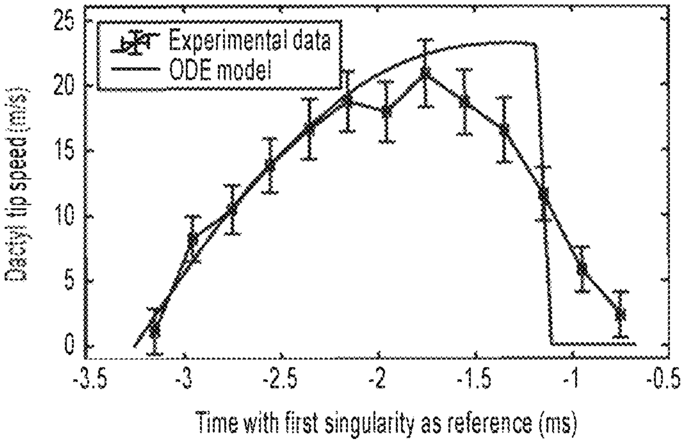
FIG. 4C shows a comparison of device dactyl plunger tip speed experimental data with a numerical model result.
Figure 4D:
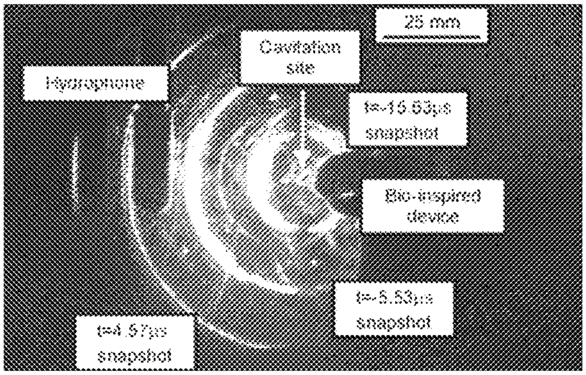
FIG. 4D Shows cavitation front speed estimation due to the high-speed water jet.

The dactyl dynamics ODE model was used to make a comparison to experimental video data obtained via feature tracking. FIG. 4C illustrates this comparison. According to experimental data, the maximum speed of the tip of the dactyl plunger 112 was 20.9±2.6 m/s, the duration of sweep was approximately 1.5 ms, and the stopping time was 1.2 ms. The cavitation front propagation speed can be used as a close estimation for water jet speed, shown in FIG. 4D. With a maximum cavitation front speed of 25.6~37.4 m/s, this implies Reynolds numbers of 0.84~1.23×105 and a cavitation number of $\sigma$=0.14~0.30, which are comparable to real shrimp, as will be discussed in further detail herein.

Schlieren Imaging of Shock Wave Underwater. Snapping shrimps contribute to underwater noise throughout the world's tropical and subtropical, shallow, ocean waters since shock waves are generated during the snaps of their snapper claws. Schlieren imaging can be used to uncover details of shrimp-produced shock wave generation and propagation.

Figure 4E:
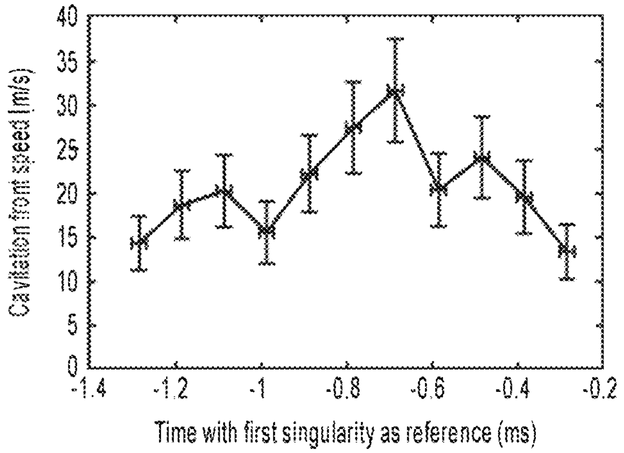
FIG. 4E shows superposition of three schlieren images during device operation showing shock wave propagation, with 100-ns exposures and 10 μs of delay between images.
Figure 4F:
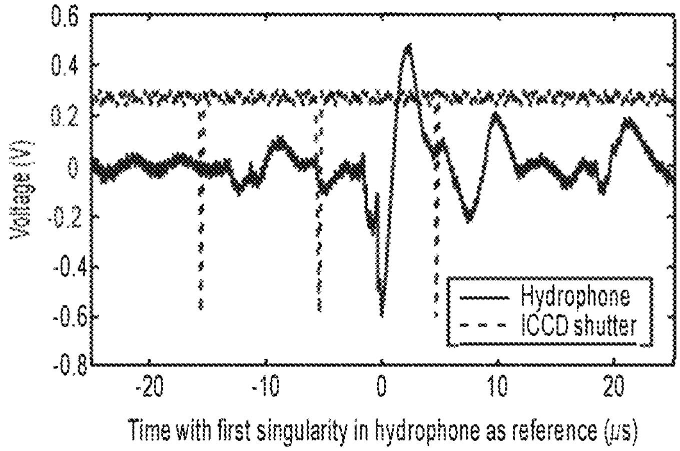
FIG. 4F shows hydrophone and ICCD shutter signals during the first singularity, which occurred at around t=−25 μs.
Figure 10A:
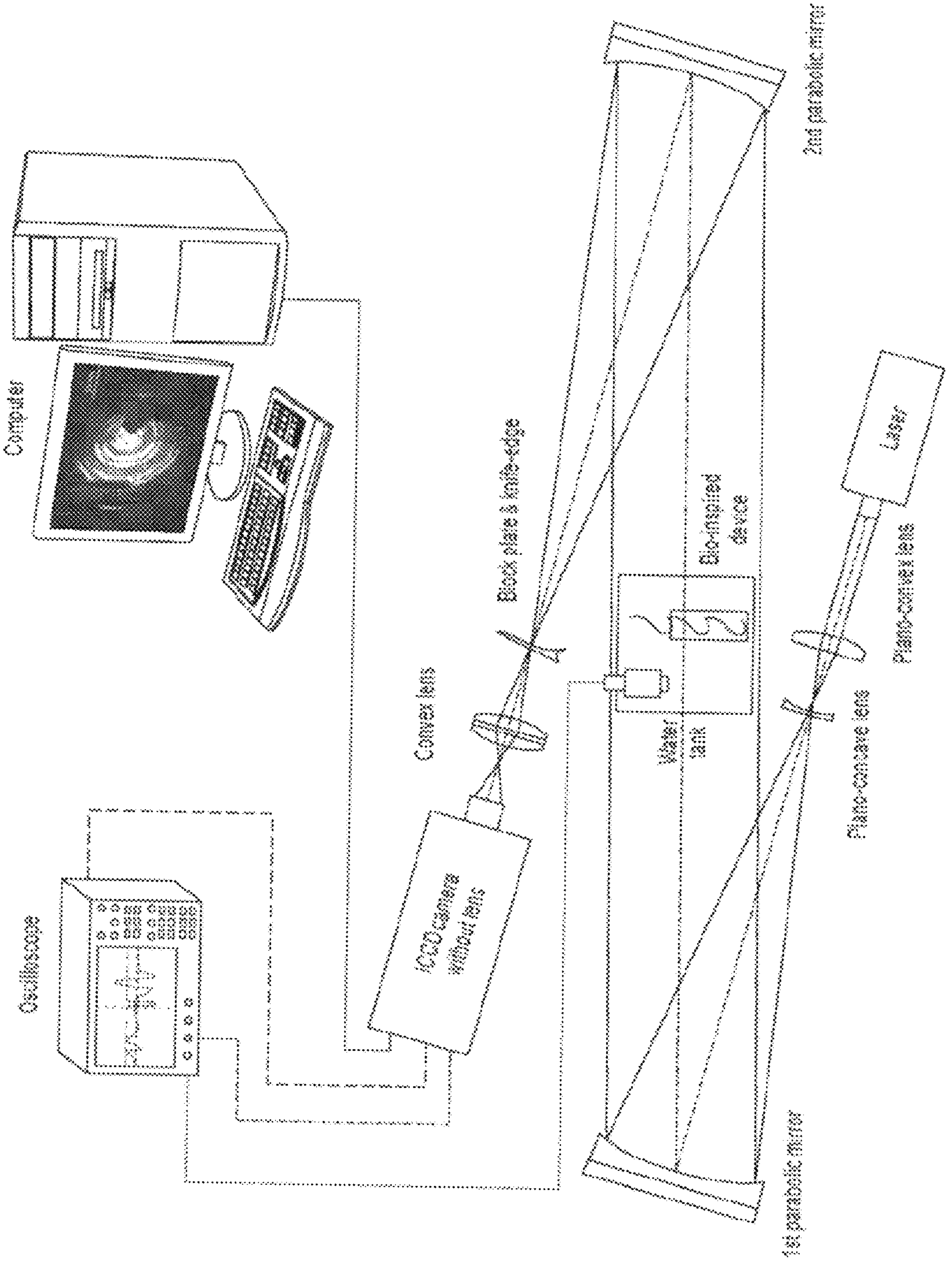
FIGS. 10A-10D illustrates schlieren imaging of underwater shock waves.
Figure 10B:
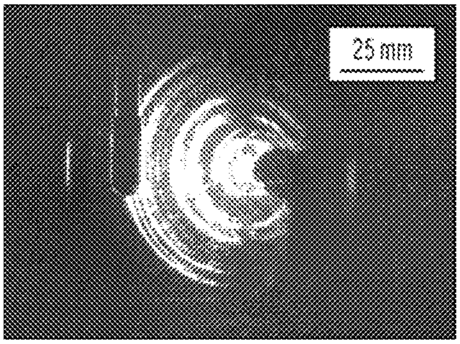
Figure 10C:
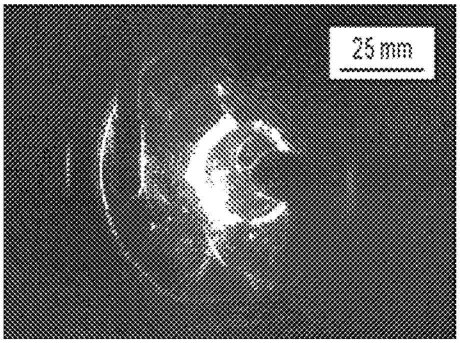
Figure 10D:
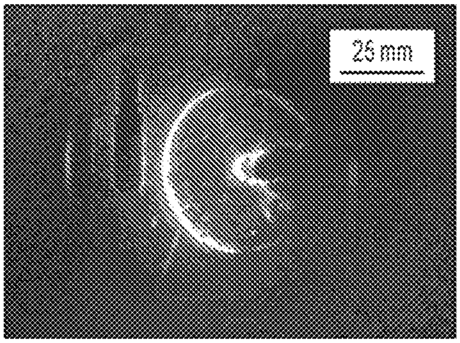

The schlieren setup used in the present disclosure was the popular Z-type 2-mirror Herschellian schlieren configuration (discussed below with respect to FIG. 10A). Multi-exposure images of the propagating shock wave generated by the bio-inspired device and corresponding hydrophone and intensified charge-coupled device (ICCD) shutter signals are shown in FIGS. 4E and 4F. In FIG. 4E, the three exposures show the expanding shock front generated by the first singularity of collapsing cavitation. The cavity and site of singularity is spotted at the center of the spherical shock wave and offset from the tip of the claw. This visualization clearly shows the shock, used by shrimp to stun prey, comes from the collapsing cavitation. The shock wave front speed was determined to be 1,487.9±39.7 m/s, the sound speed of water, as illustrated in FIGS. 10B-10D and Table 1 (shown below).

Light Emission Detection for Saline Water with Air Doping. Light emission from collapsing cavitation produced by the bio-inspired device is very dim, hardly observable by the naked eye in a darkroom. The duration of such light emission could occur at nanosecond timescales, which is similar to a single sonoluminescence event. Initial attempts to measure light emission from the device in distilled water using an ICCD camera did not yield conclusive results; to solve this issue argon doping and air doping were introduced to promote light emission.

Figure 5A:
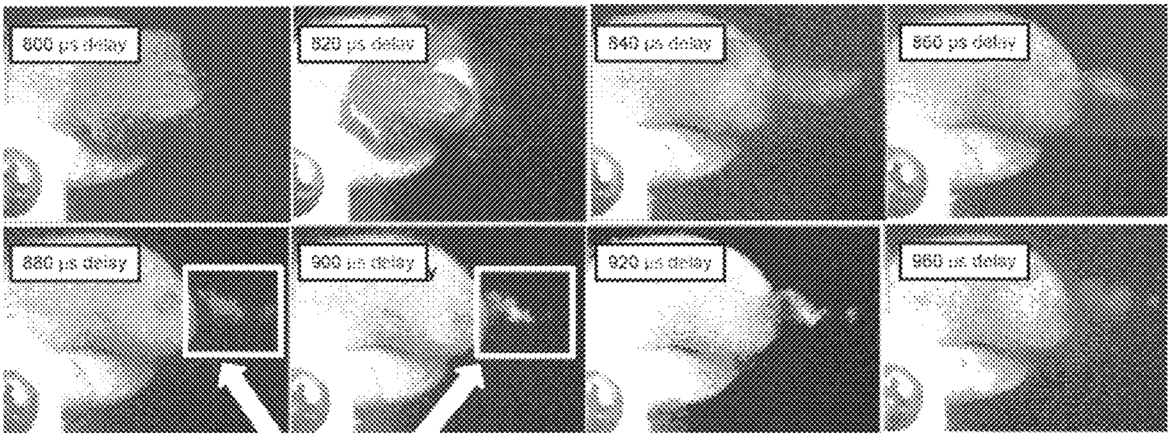
FIG. 5A shows shrimp claw imaging at different delay times using 20 μs ICCD exposure, highlighting the delays which correspond to cavitation singularities.

In order to verify the consistency of the bio-inspired device and identify regions of interest, several 1360×1024 pixel 12-bit images were taken of the bio-inspired device during operation in distilled water using an ICCD camera with a hydrophone trigger located 5 cm away from the cavitation region, at various delay times (FIG. 5A). The major cavitation singularity site location appeared to vary by ±3 mm from snap to snap. The hydrophone signal which triggered the camera was caused by sound from the manual clutch release, and was therefore prone to jitter. To address this jitter, a relatively long exposure time of 20 μs was used to image the first singularity.

Figure 5B:
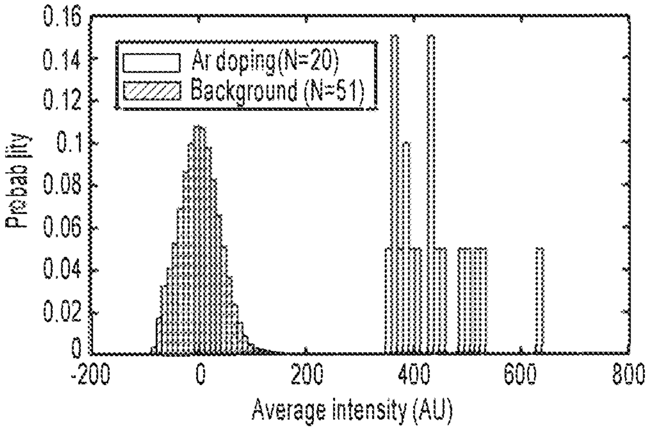
FIG. 5B shows a probability distribution of the average intensity of pixels above threshold for different trials using saline water with air doping, bin width=10.
Figure 5C:
FIG. 5C shows cavitation locations, marked by diamonds, relative to a claw, as measured by ICCD.

Saline water (35,000 ppm NaCl) was used to simulate the snapping shrimp's living condition in the ocean. In order to determine the timescale of the light emission process, a photomultiplier tube (PMT) was set up on the opposite side of the water tank to measure nanosecond timescale light emission in parallel with the ICCD camera. To reduce background noise, all light sources in the laboratory darkroom were turned off or blocked. Twenty hydrophone-triggered images were taken, then the location of all pixels with intensity significantly above the background were cataloged, discussed in further detail herein; a probability distribution histogram of average above-threshold pixel intensities is shown in FIG. 5B. The location of these above-threshold pixels, corresponding to cavitation luminescence sites, are illustrated in FIG. 5C, superimposed on a reference image to show the consistency of the first singularity position. The chosen detection threshold is nine standard deviations above the average of background noise; therefore, any signal above this can be confidently interpreted as light emission. While light has been detected before from a shrimp, or shrimp-like, cavitation system, this is the first imaging of the light emission and directly correlates the light with the cavitation singularity site.

Unlike the ICCD, the PMT can measure nanosecond timescale changes in light emission for a narrow region of interest. The ICCD images and corresponding PMT signals of claw-induced light emission in saline water with air doping are shown in FIGS. 6A-6F. A large localized cavitation and light emission event can be spotted in the ICCD image (FIG. 6A), with a spatial diameter around 118.3 μm. While the cavitation oscillated, two substantial, short (≤13 ns full-width half-maximum, FWHM), light pulses were observed in the PMT signal (FIG. 6B), which demonstrates that there was light emission from the first and second cavitation singularities.

Figure 6A:
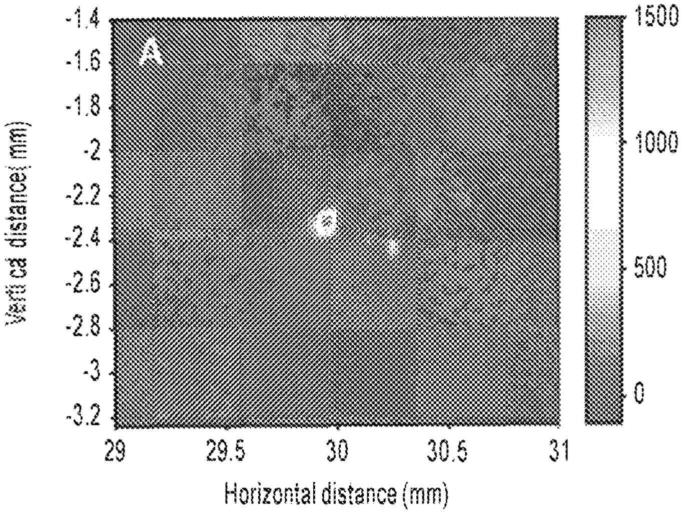
FIGS. 6A-6F illustrate light emission in ICCD images (200 μs exposure time) and corresponding hydrophone, camera shutter, and PMT signal for saline water with air doping.
Figure 6B:
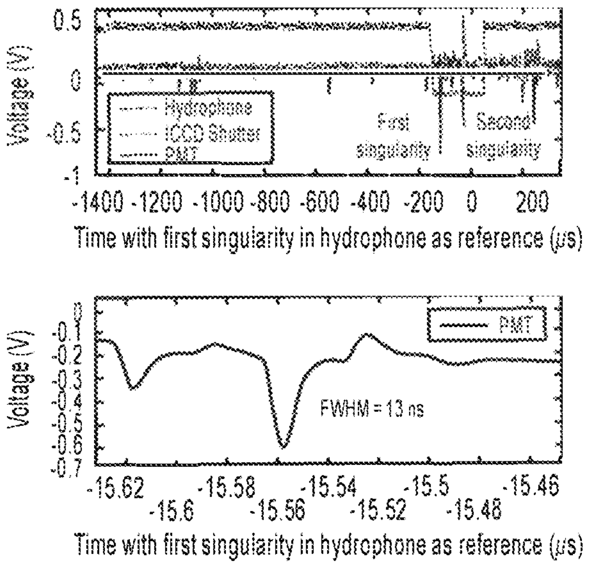
Figure 6C:
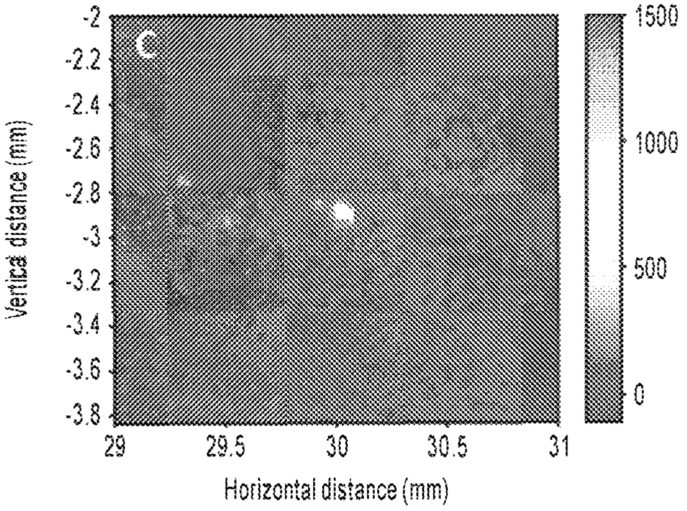
Figure 6D:
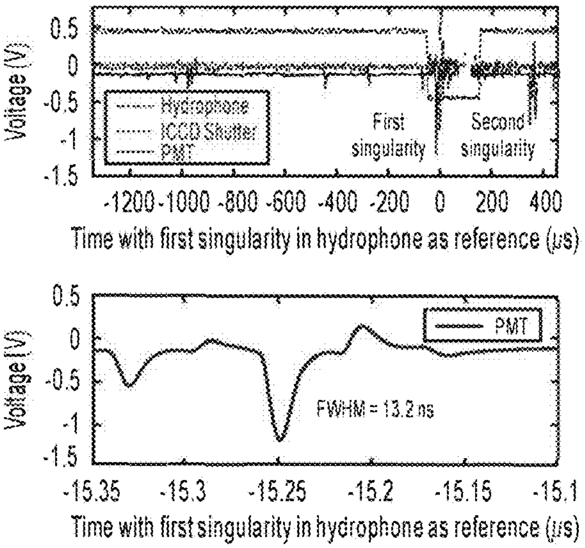
Figure 6E:
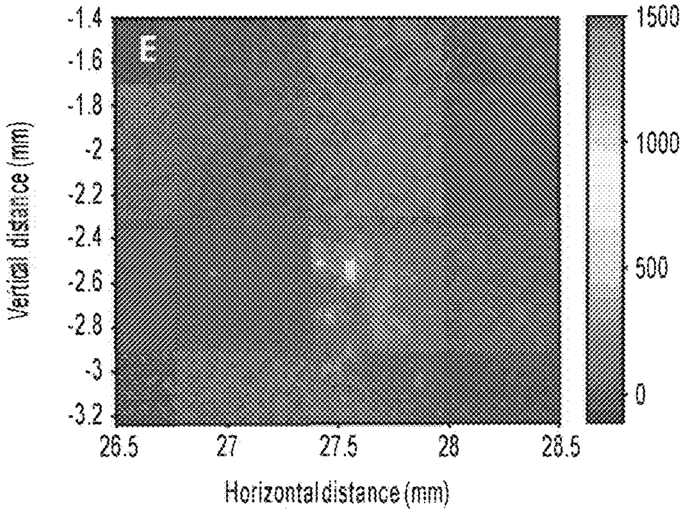
Figure 6F:
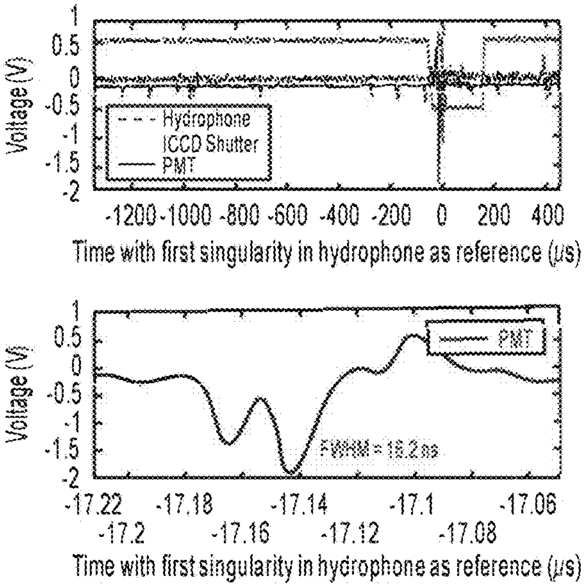
Figure 7A:
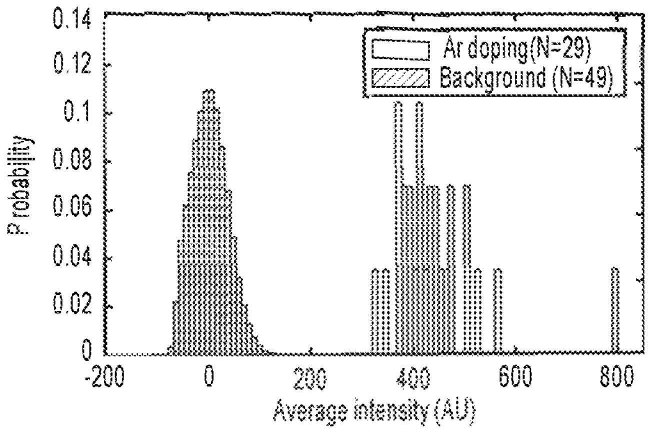
FIG. 7A-7F illustrate light emission imaging and brightness statistics for the device operating in distilled water with argon doping at 100 μs exposure time.
Figure 7B:
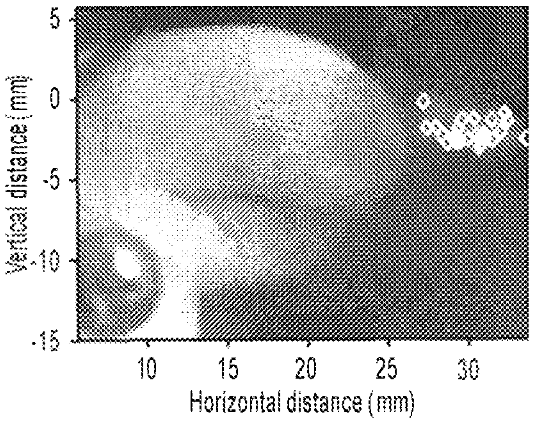
Figure 7C:
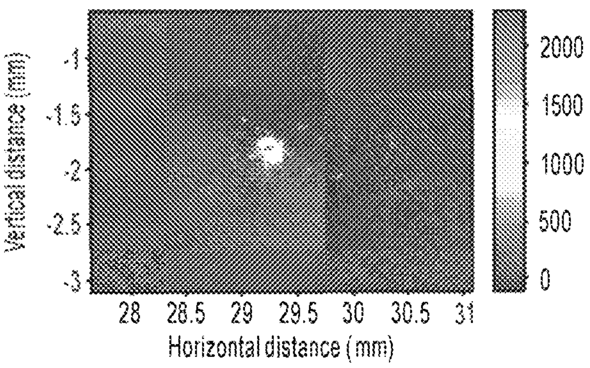
Figure 7D:
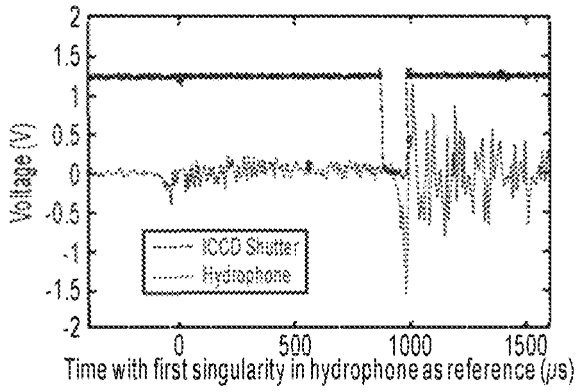
Figure 7E:
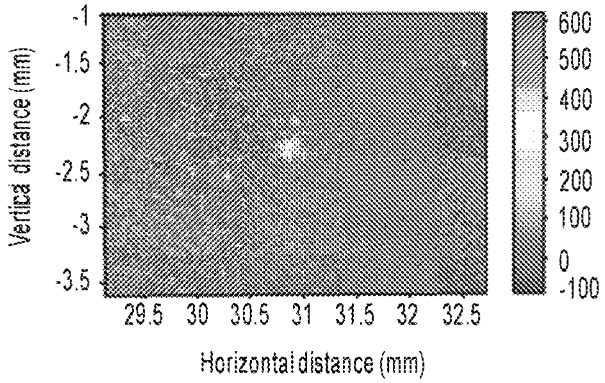
Figure 7F:
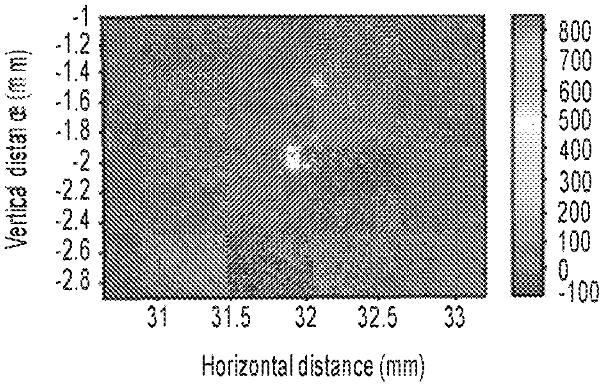
Figure 8A:
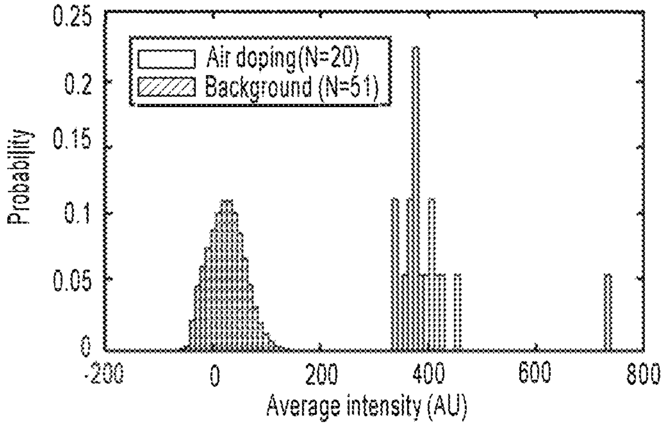
FIGS. 8A-8F illustrate light emission imaging and brightness statistics for the device operating in distilled water with air doping at 100 μs exposure time.
Figure 8B:
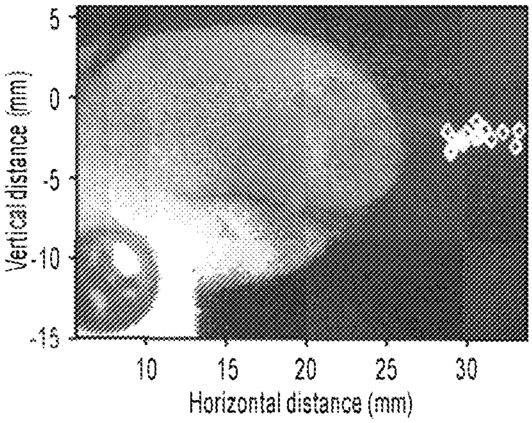
Figure 8C:
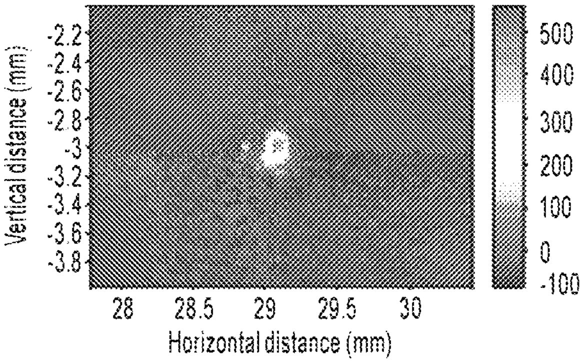
Figure 8D:
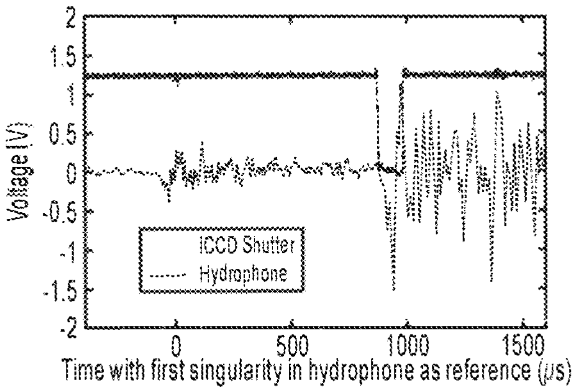
Figure 8E:
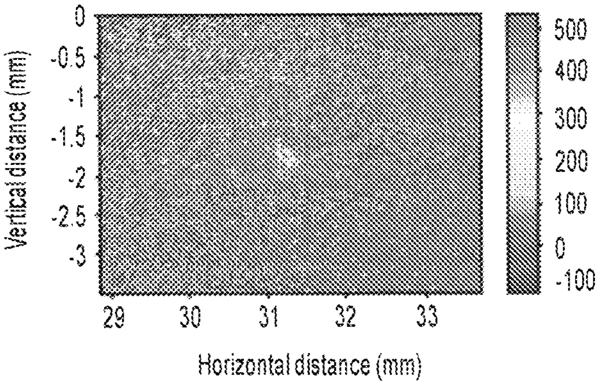
Figure 8F:
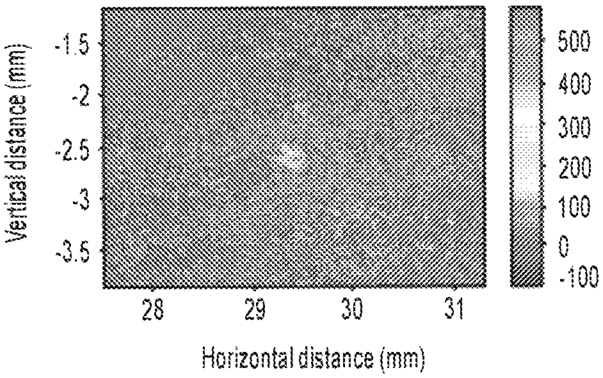

According to data from Trial #15, FIGS. 6C-6D, the brightest light pulse was slightly dimmer, with light emission duration FWHM less than 14 ns. Trail #20, FIGS. 6E-6F, has an above-average brightness, when compared to all trials. The estimated length scale of the combined light emission area in this trial approached ~600 μm, and had a slightly longer duration (less than 17 ns for FWHM), which can be attributed to the contribution of several small light emission events occurring in quick succession. The comparison of PMT signal and ICCD image intensity is discussed in further detail herein. Some discrepancy is caused by the difference on region of interest (ROI) of both devices, lenses attenuation difference, and quantum efficiency difference. Based on all results from this experiment, an interesting trend emerged which suggests that a single coherent cavitation site may enhance the light emission phenomenon and improve energy focusing compared to a cavitation cloud of numerous smaller cavitation sites. Similar results and trends were also observed using distilled water with argon doping (FIGS. 7A-7F) and distilled water with air doping (FIGS. 8A-8F). Light emissions in argon in distilled water, air in distilled water, and air in saline case were observed.

This type of bio-inspired device with complex 3D surfaces which can mimic snapping shrimp cavitation phenomena has not been previously reported. Using the bio-inspired devices disclosed herein, cavitation experiments can be carried out in various fluids other than saline water, such as distilled water, mineral oil, and other fluids, in which experiments with a live marine animal is not possible. Also, the bio-inspired devices of the present disclosure generate well-timed repetitive cavitation events, facilitating current and future designs. The streamlined geometry plays a role in targeting the high-speed jet out the angled channel and off the claw surface which induces stand-alone large cavitation and avoids self-inflicted damage to the device. The matching of non-dimensional numbers further ensure the occurrence of the cavitation event in this scaled-up design which is 5 times larger than the scanned shrimp. A factor of five scaling is still within the range of intraspecific size variation and Alpheid shrimp diversity. A distilled design with the right physical mechanisms can also work for different applications.

The ICCD images provided strong evidence of light emission generated by the collapsing cavitation in water with either air or argon doping. Light emission indicated three modes in the device cavitation luminescence: weak emissions buried in background which are below threshold, emissions enhanced by larger and more coherent cavitation corresponding to higher intensities, and emissions with the intermediate intensity range where most trials located. The larger coherent cavitation generates stronger light emission signal. This variation is stochastic, likely due to small initial condition variation and turbulence. Similar to what is observed with sonoluminescence the light emission results indicate the presence of inertially confined plasma generated by the imploding cavitation.

The bio-inspired claw's efficiency, n, in converting torsion spring energy to cavitation potential energy is around 36.1%. This is based on the initial spring energy and the available energy in displacing the ambient water from the low-pressure cavity, calculated from the maximum effective radius of cavitation during operation. Applying the same calculation methods, this conversion process is more efficient than that of single bubble sonoluminescence (NSBSL~0.014%), electrically induced cavitation ($\eta_{electric} \leq 0.058\%$), and laser-induced cavitation ($\eta_{laser} < 5.8\%$), as discussed in further detail herein. This efficiency is not luminescent efficiency, which is also affected by bubble size and shape symmetry. Temperature, which can be estimated by the light emission spectrum inside the cavitation, is a good parameter to determine thermodynamic efficiency of the compression process for this cavitation luminescence event. It is envisioned that spectroscopic study of this mechanically generated plasma phenomenon will reveal additional insights under the extreme cavitation singularity conditions.

In view of the aforementioned, disclosed herein, and in further detail below, is a constructed bio-inspired artificial mechanism which produces the same type of shock waves and plasma created by the snapping shrimp. Fabrication of this morphologically complicated device was made feasible by additive manufacturing. Effective cavitation occurs due to a high velocity well-aimed water jet. This hydrodynamic cavitation collapses to a high pressure and temperature plasma state which emits lights and shock waves upon rebounding. The physical size of the light emission area captured by the ICCD ranged from 10 to 100 μm, and often occurred at multiple singularity sites, with durations FWHM of 8 to 24 ns (15 ns in average). There are several other verified methods to produce underwater plasma and achieve cavitation luminescence, such as, for example, submerged electrical breakdown, sonoluminescence, submerged laser-induced breakdown, as well as other mechanical devices which can produce cavitation such as Venturi tubes, hydrofoils, water hammer devices, and other biomimetic devices. The devices of the present disclosure, inspired by the snapping shrimp's snapper claw (which has benefitted from cons of natural evolutionary improvement), create freestanding cavitation bubbles more efficient than those generated by the aforementioned alternate methods. Operation of the bio-inspired devices disclosed herein underwater also provide insight into how snapping shrimp species create the loud snapping sound and light emission. This design can be applied to enhance microfluidics, chemical processing, physical processing, and hydro-acoustics. The bio-inspired devices of the present disclosure can also be utilized in other dense fluids, as long as the fluid is compatible with materials available in manufacturing.

Materials and Methods

3D Scanning of Snapper Claw. The molt of the snapper claw was collected by micro-X-ray computed tomography (μ-CT scanning) in the Cardiovascular Pathology Laboratory at the Texas A & M College of Veterinary Medicine. The snapper claw molt was stabilized with cotton wool and scanned twice in the μ-CT (X-Tek Hawk CT and X-ray Imaging System). The first μ-CT scan imaged the claw in the open position with a resolution of 17.5 μm, and the second scan imaged the claw in the closed position with a higher resolution of 9.7 μm. The resulting 3D surface data was captured by Inspect-X and reconstructed by CT Pro. Then the reconstructed model was converted into a mesh file using VGStudio MAX 3.0, with manual adjustment of the opacity curve and thresholds for different materials, in order to perform surface determination. After simplifying and modifying the mesh file using MeshLab, the final product was then imported into SolidWorks for future design.

Schlieren Imaging of Underwater Shockwave. The experimental setup used was the Z-type 2-mirror Herschellian schlieren configuration. The illumination source was a continuous diode-pumped solid-state (DPSS) Class IIIb laser (300 mW, Changchun New Industries Optoelectronics Tech. Co. Ltd, China), emitting light with a wavelength of 532 nm. The laser beam was then expanded to a larger diameter collimated beam using a plano-convex lens, a plano-concave lens, and a parabolic mirror. After propagating across the image plane (water tank with bio-inspired device), the collimated laser light was then reflected and focused by a second parabolic mirror and cut off by a vertical knife-edge coated with black paint. This vertical cut-off enabled observation of any horizontal gradient in the refractive index in the test section. A plate with a 0.25-inch hole was placed immediately before the knife-edge in order to block any stray light. A single convex lens was placed after the knife-edge cut-off to increase magnification for the ICCD camera. A 4 Picos ICCD camera, Stanford Computer Optics Inc., was used in multi-exposed mode to capture the schlieren photograph of shockwave propagation, and underwater pressure signals were monitored by a Teledyne RESON hydrophone, TC 4013, 170 kHz. A multi-exposure mode was used, such that multiple images from a single snap could be recorded on the ICCD before readout, which results in image data at both high resolution and high frame rate. In this case, several 100-nanosecond exposures were delayed by 10 or 15 μs. An oscilloscope (WaveRunner 204MXi 2 GHZ, 10 GS/s, produced by Teledyne LeCroy company) was utilized to monitor the hydrophone signal and trigger the ICCD camera. The ICCD camera's gated exposure signal was also monitored on the oscilloscope, such that relative delay between trigger and exposure could be observed.

Saline Water with Air Doping. The saline water (NaCl solution) was prepared by mixing freshly opened distilled water and pure sodium chloride (>99%). The saline water concentration is around 35,000 ppm which is close to the salinity of seawater where snapping shrimp live. Before carrying out light emission detection experiments, compressed air was doped into the saline water via a bubbling disk for 30 minutes to ensure that the solubility of air in the water tank was saturated.

Distilled Water with Argon or Air Doping. Since no light emission was observed in distilled water tank without gas doping, argon or air was doped into the freshly opened distilled water via a bubbling disk for 30 minutes to ensure that the solubility of argon in the water tank was saturated. Argon was chosen initially due to its accessibility, known excitation emission spectra in the visible light range, a larger polytropic exponent at bubble collapse, and effective use in single bubble sonoluminescence experiments.

ICCD Light Emission Image Collection and Processing. The aforementioned ICCD was also used to image the light emission from the cavitation singularity using a macro lens (AF-S VR Micro-Nikkor 105 mm f/2.8G IF-ED), at 1:1 magnification ratio and f/2.8 aperture. The ICCD image exposure time was 100 μs or 200 μs with a gain setting of 1000 and artificially delayed from the clutch release time sensed by the hydrophone for around 880 μs (chosen based upon analysis of the high frame rate videos). This timing correlates to be around the first singularity and is long enough to account for most jitter in the clutch release and short enough to avoid excessive background signal. Multiple background images were taken without triggering the bio-inspired device in a darkroom. These background images were averaged and subtracted from images acquired during device operation. The average intensity of background images taken for background subtraction is around 60 counts (out of 4095 counts for a 12-bit system) for distilled water and 73 counts for saline water with an average standard deviation ($\sigma_{background}$) close to 34±3 counts. Intensity was scaled to range from $-3_{\sigma background}$ to maximum intensity with a jet color map, in order to highlight light emission of interest in the image.

For analysis of the light emission ICCD images, a threshold was chosen for distinguishing background and pixels that captured the light emission. A threshold of $9_{\sigma background}$ was chosen, thus the bright pixels above threshold are statistically significant and correspond to light emission signals. Due to the stochastic influences in the cavitation formation and collapse, not all singularities had the same brightness. Indeed one of the twenty trials did not have light emission exceeding the $9_{\sigma background}$ threshold (FIG. 4B). Also, cosmic rays and similar induced excitations could randomly induce ICCD camera signal over limited pixel regions. However, such observed signals did not correlate with the expected location of the singularity, nor the timing from the clutch release, as was the case for light emission during the cavitation collapse, as illustrated in FIG. 4C.

Torsion Spring Driven ODE Model. An aspect of designing a functional shrimp claw is choosing the spring sizes and plunger angular velocity to create an effect similar to the real shrimp. The scaling parameter was chosen to match the cavitation number $\sigma=(p-p_v)/(\frac{1}{2}\rho v^2)$, where ρ is the density of the fluid, p is the local pressure, $p_v$ is the vapor pressure of the fluid, and v is a characteristic velocity of the flow. The cavitation number was chosen, rather than another number (e.g. Reynold number) because the dominant physical process is related to dynamic pressure and not viscous drag. To mimic the shrimp process in saline water, the controllable parameter is the flow velocity of the jet which directly relates to the time it takes the plunger to displace the socket cavity volume. This in turn is directly related to the angular velocity and tip velocity of the plunger. The flow velocity was given as about 25 m/s and closing time of the claw from high frame video was 600 μs. These results lead to a target plunger tip velocity around 32~35 m/s. The corresponding Reynolds number with socket exit diameter as characteristic length was $$\mathrm{Re}_{socket} = \frac{\rho u L_{socket}}{\mu} = 9.21 \times 10^4$$

and cavitation number was σ=0.32.

Figure 9A:
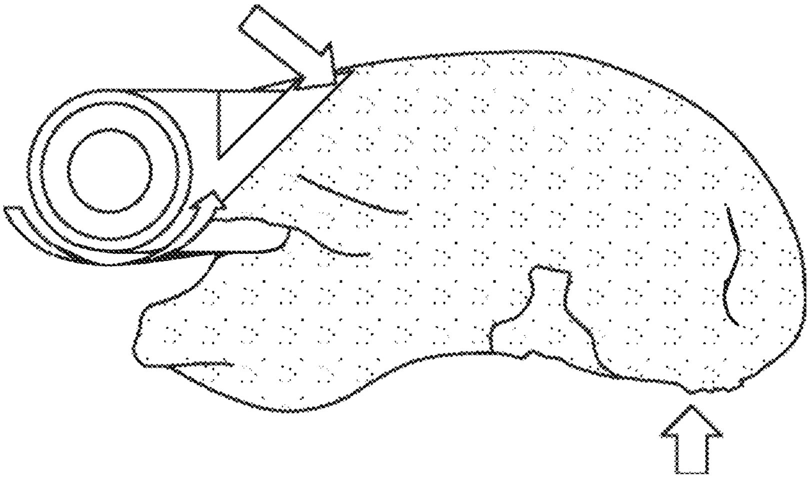
FIG. 9A shows a free body diagram of the rotating dactyl plunger.

The plunger velocity is dependent on the model moment of inertia, fluid drag, and torsion spring driving torque. In the design process a simple ordinary differential equation was proposed according to the free body diagram, shown in FIG. 9A, for depicting the rotating motion physics as illustrated in Equation 1, reproduced below.

$$I_{xx}\frac{d^2\theta}{dt^2} = -k\theta + \frac{C_{Dp}\rho b_1 R_1^4}{8}\left(\frac{d\theta}{dt}\right)^2 + \frac{C_{mc}\pi\rho R_{shaft}^4 W_{shaft}}{2}\left(\frac{d\theta}{dt}\right)^2, \quad \text{Equation 1}$$

where k is the torsion spring coefficient, θ is the deflection angle from rest position of torsion spring, $I_{xx}$ is the moment inertia about the rotation axis, $C_{Dp}$ is the drag coefficients for dactyl plunger, including corresponding friction drag and pressure drag, $C_{mc}$ represents the fluid drag coefficient for the rotating shaft, $b_1$ is the width of the dactyl plunger, $W_{shaft}$ is the width of the shaft, ρ is the density of the liquid, $R_1$ is the distance from dactyl plunger tip to the rotation axis and $R_{shaft}$ is the radius from shaft cylinder surface to rotation axis. There are four terms in this model: (i) the inertial term; (ii) the spring driving torque: (iii) fluid drag on the plunger; and (iv) fluid drag on the rotating shaft respectively from left to right. The force required for expelling the water from the socket by the plunger, as well as the contact, rubbing, or lubrication flow forces close to closure, are not included in this model. The third, dactyl plunger drag term is complicated as it involves a variation in flow velocity along the length of the dactyl plunger as shown in Equation 2. As simplified, this ODE is readily solved using an explicit Runge-Kutta scheme.

$$F_{Dp} = \int_0^{R_1} dF_{Dp} = \int_0^{R_1} C_{Dp}\frac{1}{2}\rho\omega^2 r^2 b_1 dr \quad \text{Equation 2}$$

$$\|D_p\| = \|r \times F_{Dp}\| = \int_0^{R_1} C_{Dp}\frac{1}{2}\rho\omega^2 r^3 b_1 dr = \frac{C_{Dp}\rho\omega^2 b_1 R_1^4}{8} = \frac{C_{Dp}\rho b_1 R_1^4}{8}\left(\frac{d\theta}{dt}\right)^2$$

Drag coefficient data are used for the dactyl plunger, selecting $C_{Dp}\approx 0.5$, where the Reynolds number for the dactyl plunger tip (with dactyl plunger length as the characteristic length) ranges from 0 to $7.55\times10^7$. For the fourth term, the shaft radius is constant and no integration is needed; a value of $$C_{mc} = \frac{8}{\text{Re}},\ \text{Re} < 60 \text{ and } C_{mc} = \left(\frac{1}{-0.8572 + 1.25\ln\left(\text{Re}\sqrt{C_{mc}}\right)}\right)^2,$$

$$60 \leq \text{Re} \leq 5.6\times10^6$$

are used, where the Reynolds number varies from 0 to $1.52\times10^5$ using the shaft diameter as the characteristic length.

Three types of 90-degree torsion springs were chosen, including both left-hand and right-hand configurations. The detailed parameters are listed in Table 1, shown below. The torsion spring coefficient, k, is calculated by the torque value at 90° deflection angle. The moment of inertia component $I_{zz}$ can be easily obtained from SolidWorks with the material density known for the specific plunger model. The torsion springs are labeled from weak to strong based on torque. Relative to its neutral angle, the spring is acting from 100° to 25°. It is not known precisely how this torque compares to a real shrimp due to difficulties in measurement for the live shrimp. By variation of the springs, a range of closure times and velocities can be attained. Table 1, below, illustrates torsion spring parameters.

TABLE 1

| Spring Type | Spring OD | Wire Dia. | Leg Len. | Max. Rod OD | No. of Coils | Torque in-lbs | Moment N*m | Spring Length @Torque | k N*m/rad |
|---|---|---|---|---|---|---|---|---|---|
| Weak | 0.315" | 0.035" | 1.250" | 0.187" | 3.25 | 1.071 | 0.121007 | 0.135" | 0.077035 |
| Intermediate | 0.309" | 0.040" | 1.250" | 0.187" | 4.25 | 1.473 | 0.166427 | 0.198" | 0.10595 |
| Strong | 0.357" | 0.045" | 1.250" | 0.203" | 4.25 | 2.143 | 0.242126 | 0.259" | 0.154142 |

Figure 9B:
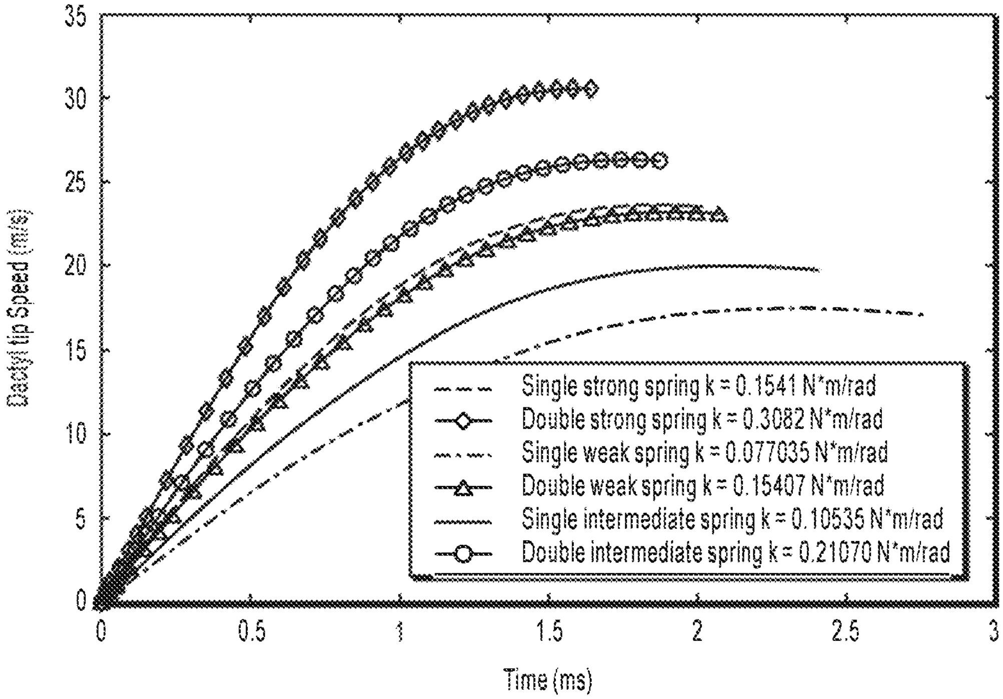
FIG. 9B shows dactyl plunger tip speed with white strong flexible plastic material for Cd=0.5.

The ODE is solved with relative tolerance $1\times10^{-6}$. The snap shut starts with initial condition (t=0 s) at a deflection angle around 100° and stops at a deflection angle around 25°, during which the driven torque is non-zero. The ODE results for 3D printed white strong flexible plastic dactyl plunger with varying torsion springs are illustrated in FIG. 9B. These ranges of velocities are comparable to those from the real shrimp, and should lead to similar cavitation phenomena. The neglected forces will lead to the ODE model over predicting the velocity in the last 0.25 to 0.5 ms prior to closure.

Shock Wave Front Propagation Speed Estimation. Based on the calibrated images, the shockwave propagation speed can be estimated. The measured results are illustrated in Table 2, shown below. The jitter of the ICCD is 0.02 ns and the ICCD internal delay between trigger and shutter is 65 ns. The distance measurement was calibrated using the hydrophone's known length of 25 mm. The total uncertainty is approximately 2.67%. The distilled water was 21±0.2° C. when conducting the experiments. Table 2, below, illustrates measured results of underwater shock wave propagation speed.

TABLE 2

| Trial | Shock Wave Front (Inner to Outer, 1=> 3) | Distance Between Shock Waves (mm) | Speed of Sound (m/s) |
|---|---|---|---|
| FIG. 4E | 1-2 | 14.845 | 1484.5 |
| | 2-3 | 15.049 | 1504.9 |
| | 1-3 | 30.086 | 1504.3 |
| FIG. 10B | 1-2 | 14.706 | 1470.6 |
| | 2-3 | 14.939 | 1493.9 |
| | 1-3 | 29.329 | 1466.5 |
| FIG. 10C | 1-2 | 29.742 | 1487.1 |
| FIG. 10D | 1-2 | 22.368 | 1491.2 |

Cavitation Conversion Efficiency. Cavitation efficiency defined in this disclosure is the ratio of the largest cavitation potential energy over input energy, $$\eta = \frac{E_{pot1}}{E_{input}},$$

in which $E_{pot1}$ presents the maximum cavitation effective radius potential energy and $E_{input}$ stands for the energy input for inducing the cavitation. The potential energy of a cavitation bubble is estimated as:

$$E_{pot} = \int_0^R 4\pi r^2 \Delta p dr = \frac{4\pi}{3} R^3 \Delta p, \quad \text{Equation 3}$$

where R is the cavitation effective radius and Δp represents the pressure difference between the liquid pressure $p_\infty$ and cavitation internal pressure p. Therefore the largest potential energy for cavitation is estimated at the maximum radius for a spherical bubble and cavitation or effective radius for non-spherical ones.

$$E_{pot1} = \int_0^{R_{max}} 4\pi r^2 \Delta p dr = \frac{4\pi}{3} R_{max}^3 \Delta p \quad \text{Equation 4}$$

With this definition, the conversion efficiency for different cavitation generation techniques can be estimated and compared. The input energy for mechanical-induced cavitation in this disclosure is the torsion springs, as defined below:

$$E_{torsion} = \frac{1}{2} k\theta^2, \quad \text{Equation 5}$$

where k is the torsion spring coefficient and the deflection angle of the torsion spring is θ. With the aforementioned parameters in this disclosure, the bio-inspired device cavitation conversion efficiency is around 36.1%.

The circuit driving energy for a typical cycle of single bubble sonoluminescence (SBSL) can be estimated by:

$$E_{SBSL} = \frac{P}{f} = \frac{V_{p-p} I_{p-p} \cos\theta}{8f}, \quad \text{Equation 6}$$

where $V_{p-p}$ is the peak-to-peak drive voltage on the piezoelectric transducers, $I_{p-p}$ stands for peak-to-peak drive current, cos θ is power factor of the AC circuit in which θ is the phase difference by which the current lags the voltage. According to those parameters previously identified, f=25.2 kHz, $I_{p-p}$=80 mA, cos θ=cos 8°=0.99, the corresponding cavitation maximum radius $R_{max}$=45 μm, and $V_{p-p}$≈700 V, the SBSL cavitation conversion efficiency is around 0.014%, neglecting other energy losses in the circuit.

For the electric-induced cavitation methods there are single-electrode corona discharge and two-electrode spark discharge in liquids. For corona discharge in liquid, input energy, an estimation for input energy of micro-plasma generated cavitation bubble with single-spark-gap switch (103.1 mJ) and double-spark-gap switch (0.552 mJ), respectively, was utilized. Comparing to the maximum radius of the cavitation generated with single-spark-gap switch ($R_{max}$=130 μm) and double-spark-gap ($R_{max}$=88 μm), the corresponding cavitation conversion efficiencies were around 0.009% and 0.058%, respectively. For spark discharge in liquid, a cavitation conversion efficiency of approximately 4.5% can be achieved by capacitor stored electric energy, which is approximately equal to input energy associated with the torsion spring 116.

For the laser-induced cavitation, the input energy ($E_{pulse}$) is usually the laser pulse energy, which varies depending on the laser utilized for the experiment. From previous studies, the maximum laser-induced cavitation conversion efficiency $$\left(\eta_{laser} = \frac{E_{pot1}}{E_{pulse}}\right)$$

is less than 19.3%. Considering the wall-plug efficiency around 30% for laser systems with extra cooling, the laser-induced cavitation conversion efficiency is less than 5.8%.

Figure 11:
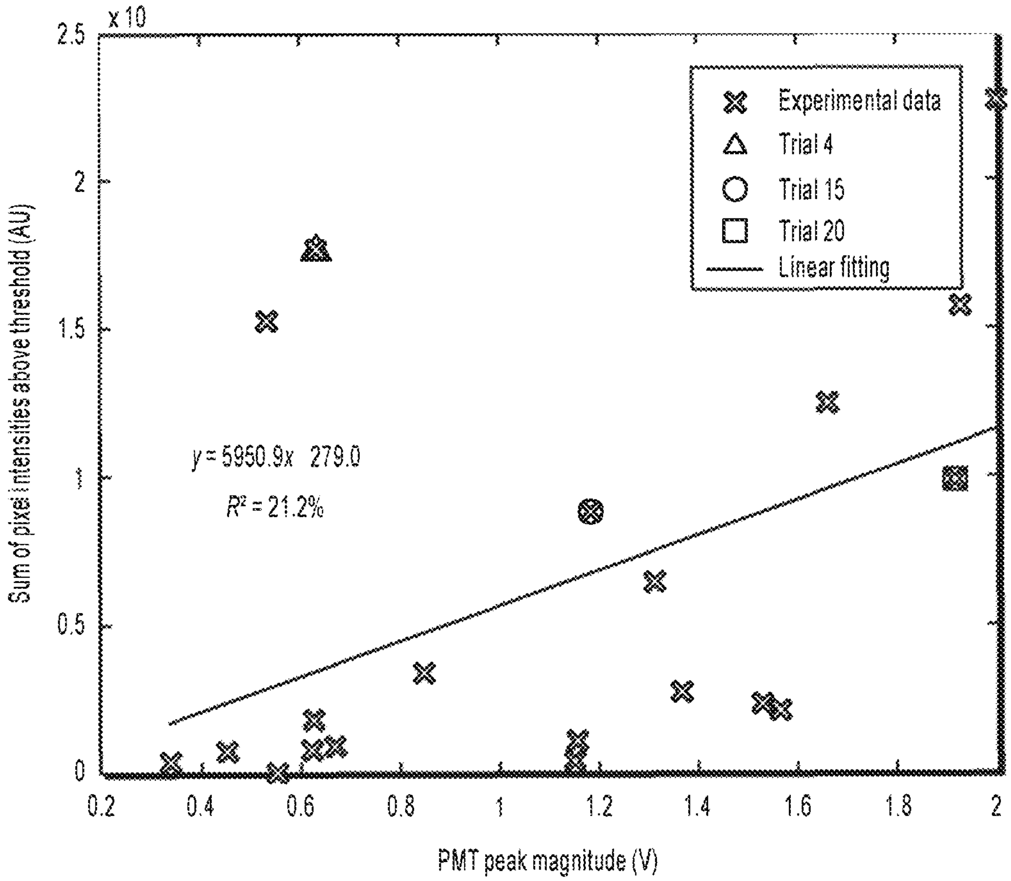
FIG. 11 illustrates relation between PMT signal peaks and ICCD image sum of pixel intensities above threshold (9σ).

Relation between PMT Signal Peaks and ICCD Images. Since PMT and ICCD cameras were placed at different position during light emission experiments, there are ROI differences, lenses attenuation differences, and quantum efficiency differences for both devices. Their relation is illustrated in FIG. 11. PMT peak magnitudes were scaled up 5 times to make the data comparable.

Automatic Snapping Design. The bio-inspired device was initially cocked and triggered (clutch releasing mechanism) by hand, which was sufficient for high-frame-rate imaging of cavitation, shock wave, and plasma generation investigation. However, for characterizing the plasma (by taking spectrum results from the light emission) generated during the collapsing cavitation, the manually triggered device demands much higher frequency due to the low light challenge. Therefore, a new design with automatic snapping mechanisms needed to be implemented for experimental research and industrial applications.

FIG. 2A illustrates a design of the bio-inspired device of the present disclosure. A gear-cam system is introduced for cocking and triggering the dactyl plunger to snap. The driven torque from the pinion gear for cocking the dactyl gear is provided by a motor with a gearbox (e.g. McMaster 6409K15). The torque is transferred by two pulleys connected by a timing belt, which keeps the motor and gearbox above water level. The size of the two pulleys can also be modified to change the snapping frequency. The pulley sharing the same shaft of the pinion gear transfers the torque via the shaft and lifts the dactyl gear, overcoming the torsion springs which mimics the shrimp's muscle. The pinion gear utilizes four pairs of gear teeth which couple with dactyl gear teeth (FIG. 2B). The number of pairs is adjustable to allow for different snapping frequency. A two gear teeth design that works as a cam are carefully implemented to ensure the cocking angle before releasing when dactyl gear detached from pinion gear.

With this automatic snapping system, the snapping frequency can be adjusted to 0.8 Hz, making great progress compared to a manual triggering mechanism (approximately 0.05 Hz or less). Considering the choice of gear motor, pulley, and pair of gear teeth, there is a large potential to upgrade the snapping frequency to the order of 10 Hz.

Automatic Snapping Test. An experimental setup was designed with snapping frequency around 0.8 Hz. The two bearing holder on both sides of the claw were printed using Formlabs Stereolithography (SLA) 3D printer with clear resin. The base and lateral support were manufactured in a machine shop. All the other parts were acquired from McMaster. The gear cam components, including the dactyl gear, pinion gear, and socket were 3D printed with rigid resin. The fitting test of the gear cam design was carried out in a water tank with most parts, except gear motor, submerged in water. Pinion gear teeth and dactyl gear teeth were modified and enhanced to ensure the mechanical properties to survive the impact load during the snapping process.

Scaling Laws for Device Scale-Up

Scaling laws describe the functional relationship between two physical quantities that scale with each other over a significant interval. It is a valuable tool for determining how structures and processes scale. Using scaling laws for the design of shrimp-like mechanical device is useful, as building a full-scale prototype is too small and impractical. An alternate strategy is to build a scale-up model targeted for certain applications and use scaling laws to determine how the full-scale system will behave. This method of scale modeling is often used in aerodynamics and hydrodynamics.

The Buckingham Pi Theorem is a theorem in dimensional analysis and it is the basis of scaling laws. The theorem provides a method for computing sets of dimensionless parameters from the given variables, or nondimensionalization, even if the form of the equation is still unknown. These scaling laws and dimensional analysis are utilized in biology, for example, in strength to weight ratios and volume to surface area ratios. One example is the ratio between the snapper claw socket volume and high-speed water jet velocity. This is similar to the inverse case of scaling law for 2D geometry extended into 3D.

Dimensionless numbers in fluid mechanics, such as Reynolds number, cavitation number (similar to Euler number), Weber number, and Ohnesorge number are quantities that have a role in analyzing the behavior of fluids. These dimensionless numbers which are related to the shrimp-like device cavitation generation process are introduced herein below.

The Reynolds number is defined as ratio of inertial force:

$$\mathrm{Re} = \frac{\rho u l}{\mu} = \frac{u l}{\nu},$$

it is used for estimating drag coefficients for the shrimp device during snapping process. In the definition of Reynolds number, ρ is the density of the fluid, u is the characteristic velocity of the fluid, l is the characteristic length, μ and ν are the dynamic viscosity and kinematic viscosity of the fluid, respectively.

The cavitation number is used to characterize the potential of the flow to cavitate, and it describes the relationship between the difference of a local absolute pressure from the vapor pressure and the kinetic energy per volume. The definition of cavitation number is given as:

$$Ca = \frac{p - p_v}{1/2\rho v^2}, \qquad \text{Equation 7}$$

where ρ is the density of the fluid, p and $p_v$ are the local pressure and vapor pressure of the fluid, respectively, and ν is the characteristic velocity of the flow.

The Euler number describes the relationship between a local pressure drop caused by restriction and the kinetic energy per volume of the flow, and it is used to characterize energy losses in the flow. It is defined as follows:

$$Eu = \frac{\text{Pressure forces}}{\text{Inertial forces}} = \frac{(p_u - p_d)L^2}{(\rho L^3)(v^2/L)} = \frac{p_u - p_d}{\rho v^2}, \qquad \text{Equation 8}$$

where ρ is the density of the fluid, $p_u$ and $p_d$ are the upstream pressure and downstream pressure, respectively, and ν is a characteristic velocity of the flow.

The Weber number is often useful in analyzing fluid flows where there is an interface between two different fluids, especially for multiphase flows with strongly curved surfaces. It describes the relationship of the inertia compared to its surface tension. The Weber number is defined as:

$$We = \frac{\rho v^2 l}{\sigma}, \qquad \text{Equation 9}$$

where ρ is the density of the fluid, ν is a characteristic velocity of the flow, l is the characteristic length, and σ is the surface tension between the interface phases.

The Ohnesorge number describes relationship of the viscous forces to inertial and surface tension forces. It is defined as:

$$Oh = \frac{\mu}{\sqrt{\rho\sigma l}} = \frac{\sqrt{We}}{\text{Re}} \sim \frac{\text{viscous forces}}{\sqrt{\text{inertia} \cdot \text{surface tension}}}, \qquad \text{Equation 10}$$

where μ is the viscosity of the fluid, ρ is the density of the fluid, σ is the surface tension, and/is the characteristic length.

The snapping shrimp's cavitation generating process involves fluid drag, turbulence, phase change, and hydrodynamic instabilities. The dimensionless numbers mentioned above, without limitation, play roles in the shrimp-induced cavitation process. During the design of the shrimp-like devices, these dimensionless numbers are used for the reproduction of shrimp plasma generation methods.

Another aspect is the morphology difference of the snapper claw among different snapping shrimp species. For example, Alpheus heterochaelis had a claw which is approximately 1.5 cm long (from pivot point to plunger tip). The snapping shrimp as modeled herein is Alpheus formosus, the stripped snapping shrimp. The size of the snapper claw molt collected was ~0.5 cm long. The ratio of plunger tooth protrusion depth for the big claw-snapping shrimp is much larger compared to the stripped snapping shrimp (the big claw-snapping shrimp is ~2.5 and the stripped snapping shrimp ~0.2). This means that at the same snapper claw length, the big claw-snapping shrimp can shoot out ~2.2 times more volume of water than that produced by the stripped snapping shrimp.

Scale-Up of the Bio-Inspired Device. Scale-up of the device helps to get larger cavitation events which in turn will get more intensive energy focusing process when the cavitation collapses. The plasma generated during the collapsing cavitation will have higher temperatures and pressures due to the higher volume compression ratio for a larger cavitation bubble radius. During the design process of scale-up, dimensionless numbers like Reynolds number is kept as constant. Table 3, shown below, is presented as an example of scaling-up shrimp-like devices of the present disclosure. The characteristic length of the device is 5 times of the shrimp claw, and a water-glycerin mixture solution is prepared for Reynolds number matching. The kinematic viscosity for the prototype fluids can be achieved by mixing water and glycerin at certain percentage, which can be easily estimated by utilizing related equations. With the scaling laws, the fluid patterns between the actual shrimp claw in seawater and bio-inspired devices in mixture solutions can have similar behavior. Table 3, below, illustrates scale-up of prototype shrimp devices with the same Reynolds number.

TABLE 3

| Parameters | Symbols | Shrimp Claw | Model |
|---|---|---|---|
| Reynolds number | Re | 120,000 | 120,000 |
| Kinematic viscosity [$m^2/s$] | υ | $10^{-6}$ | $2.5 \times 10^{-6}$ |
| Characteristic velocity [m/s] | u | 30 | 15 |
| Characteristic length [m] | l | 0.004 | 0.02 |

Cavitation number, however, is not dependent on geometry or characteristic length. As long as the high-speed water jet has a close value of characteristic velocity and the fluid vapor pressures are similar, the cavitation number can easily be matched. With similar Cavitation numbers between bio-inspired devices and the shrimp, the shrimp cavitation phenomenon will be reproduced by the bio-inspired mechanical devices.

Applications and Advantages

Nanoparticles. Plasmas generated by bio-inspired device of the present disclosure are microscale plasmas in liquid. Micro-plasmas in liquids enable new ways to synthesize nanomaterials directly in solution. Micro-plasmas can be coupled with liquids to directly reduce aqueous metal salts and produce colloidal dispersions of nanoparticles. The advantage in this case is that metal nanoparticles can also be produced at ambient conditions (atmospheric pressure and room temperature) in various liquids more efficiently, and it is biocompatible compared to traditional colloidal growth methods using chemical reducing agents. Also, as the micro-plasmas are short duration with size and energy controllable by liquid and initial cavitation conditions, there are methods to control particle size and structure.

Kinematically Stable and Thermodynamically Unstable Material Synthesis. High-temperature and high-pressure during the collapse of cavitation can lead to pressures in excess of 1 GPa while temperature may range from 1000s of Kelvin to ambient temperature in a gradient while still at those pressures in the liquid surrounding the cavitation singularity. Those conditions allow for alteration of material into different equilibrium phases. Because the processes are transient with very large temporal gradients in both pressure and temperature (dP/dt and dT/dt) the exotic phases which form may be kinetically trapped in that phase (reaction rates once temperature reduces would be too slow for the material to revert to ambient pressure equilibrium phases). Examples of these exotic phases of materials include, without limitation, diamond synthesis, carbon-monoxide polymorphs, nitrogen polymorphs, double hexagonal closest-packed (DHCP) gold, and similar phases which are typically only stable in high-energy states.

Water Treatment. Cavitation is widely used in water treatment processes with or without direct addition of oxidizing agents. The cavitation radius induced by bio-inspired devices is much larger than traditional hydrodynamic and ultrasonic cavitation methods and therefore higher temperatures and pressures can be achieved in this energy focusing process of cavitation collapse, generating more radicals to kill organisms entrained in water. Plasmas formed in water can produce hydrogen peroxide, ozone, hydroxyl radicals, and ultraviolet (UV) light, all of which are used in water treatment applications.

Weapon and Machining Systems. For snapping shrimp, cavitation generation is used in hunting, defense, tunneling, and intraspecific communication. With enlarged bio-inspired devices, large cavitation generation and shock wave emission can be implemented to design underwater weapon systems and drilling devices.

Biomedical Application. Larger, coherent, cavitations produce stronger shock waves during their collapse. The shock wave emission can be used to disintegrate kidney stones and gallstones. Similar to the ultrasound technique, the shrimp's shock wave emission technique is also well controlled and accurately targeted. Therefore, a significant potential of biomedical applications can be approached using the bio-inspired devices as disclosed herein.

Oil Cracking. Cavitation and plasmas have both been implemented in crude oil and other heavy liquid hydrocarbon material cracking together with conventional method such as thermal cracking and catalytic cracking, among others. As an efficient plasma source and cavitation generator, bio-inspired devices, such as those disclosed herein, with automatic snapping modifications can play an important role in batch processing of hydrocarbons and crude oil cracking.

Figure 12:
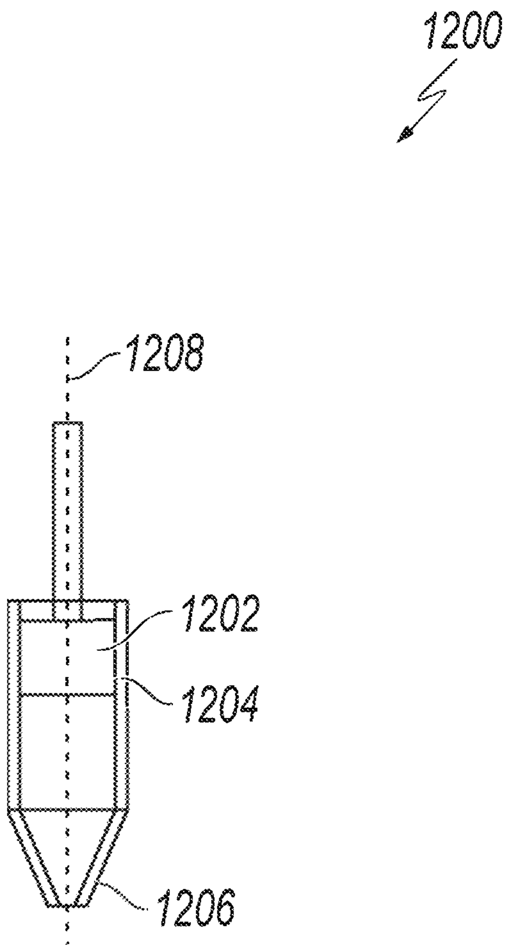
FIG. 12 is a schematic diagram of an exemplary linear cavitation generating device utilizing a linear plunger actuator and a nozzle within a socket such that liquid is ejected outwardly of the nozzle exit orifice to induce cavitation.

FIG. 12 is a schematic diagram of a linear cavitation generating device 1200. The linear cavitation generating device 1200 includes a plunger 1202 that is slidably disposed within a socket 1204. A nozzle 1206 is formed at the end of the socket 1204. The plunger 1202 is able to translate in a linear fashion along a central axis 1208 of the socket. In various embodiments, the plunger 1202 is constructed of a non-liquid absorbent material that, during actuation, allows the plunger 1202 to expel liquid from the socket 1204 through the nozzle 1206. In various embodiments, the plunger 1202 may be actuated, for example, by a compression spring or impact force sufficient to cause rapid linear movement of the plunger 1202 within the socket 1204. In other embodiments, the plunger 1202 may be driven by, for example, an electric motor. In various embodiments, the plunger 1202 is an impact stud a piston. Actuation of the plunger 1202 ejects liquid from the socket 1204 through the nozzle 1206. The nozzle 1206 increases an exit velocity of the liquid such that cavitation is induced in the area surrounding the nozzle 1206.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A method of inducing a cavitation comprising:
- biasing a dactyl plunger via a torsion spring;
- rotating the dactyl plunger, by action of the torsion spring, into a propus socket, the propus socket comprising a nozzle-shaped channel; and
- ejecting a socket cavity volume through the nozzle-shaped channel thereby inducing a cavitation event,
- wherein the ejecting creates at least one of a shock wave and plasma.

2. The method of claim 1, comprising creating at least one implosion singularity at at least one of a surface of the dactyl plunger and a distance from the dactyl plunger.

3. The method of claim 2, comprising creating an expanding shock front generated by the at least one implosion singularity, wherein the at least one implosion singularity is a result of collapsing cavitation.

4. The method of claim 1, comprising converting torsion spring energy of the torsion spring to cavitation potential energy.

5. The method of claim 1, wherein the cavitation event results in an emission of light.

6. The method of claim 1, wherein the dactyl plunger is rotatable about an axis formed by a flanged ball bearing assembly.

7. The method of claim 1, comprising a clutch coupled to the dactyl plunger.

8. The method of claim 1, comprising an angle between a channel direction and a rotational plane of the dactyl plunger.

9. The method of claim 1, comprising imparting, via a motor, rotational motion to a drive shaft, the drive shaft causing rotation of a pinion gear, the pinion gear engaged with a dactyl gear, the dactyl gear imparting motion to the dactyl plunger.

10. A method of inducing a cavitation comprising:

biasing a dactyl plunger via a torsion spring;

rotating the dactyl plunger, by action of the torsion spring, into a propus socket, the propus socket comprising a nozzle-shaped channel; and ejecting a socket cavity volume through the nozzle-shaped channel thereby inducing a cavitation event, wherein the rotating comprises imparting, via a motor, rotational motion to a drive shaft, the drive shaft causing rotation of a pinion gear, the pinion gear engaged with a dactyl gear, the dactyl gear imparting the rotating of the dactyl plunger.

11. The method of claim 10, comprising creating at least one implosion singularity at at least one of a surface of the dactyl plunger and a distance from the dactyl plunger.

12. The method of claim 11, comprising creating an expanding shock front generated by the at least one implosion singularity, wherein the at least one implosion singularity is a result of collapsing cavitation.

13. The method of claim 10, comprising converting torsion spring energy of the torsion spring to cavitation potential energy.

14. The method of claim 10, wherein the cavitation event results in an emission of light.

15. The method of claim 10, comprising creating at least one of a shock wave and plasma as a result of the ejecting.

16. The method of claim 10, wherein the dactyl plunger is rotatable about an axis formed by a flanged ball bearing assembly.

17. The method of claim 10, comprising a clutch coupled to the dactyl plunger.

18. The method of claim 10, comprising an angle between a channel direction and a rotational plane of the dactyl plunger.

19. A method of inducing a cavitation comprising:

biasing a dactyl plunger via a torsion spring;

rotating the dactyl plunger, by action of the torsion spring, into a propus socket, the propus socket comprising a nozzle-shaped channel; and ejecting a socket cavity volume through the nozzle-shaped channel thereby inducing a cavitation event, wherein the cavitation event creates an implosion singularity at at least one of a surface of the dactyl plunger and a distance from the dactyl plunger.

20. The method of claim 19, comprising creating an expanding shock front generated by the at least one implosion singularity, wherein the at least one implosion singularity is a result of collapsing cavitation.

* * * * *